(12) United States Patent
Lefferts et al.

(10) Patent No.: US 7,789,407 B2
(45) Date of Patent: Sep. 7, 2010

(54) VEHICLE WITH ELASTOMERIC BEARING SUSPENSION SYSTEM AND ELASTOMERIC BEARING THEREFOR

(75) Inventors: Scott R. Lefferts, Holly Springs, NC (US); Stefan Barbulescu, Cary, NC (US); Timothy J. Kubat, Erie, PA (US)

(73) Assignee: LORD Corporation, Cary, NC (US)

( * ) Notice: Subject to any disclaimer, the term of this patent is extended or adjusted under 35 U.S.C. 154(b) by 152 days.

(21) Appl. No.: 11/868,706

(22) Filed: Oct. 8, 2007

(65) Prior Publication Data

US 2008/0157496 A1   Jul. 3, 2008

Related U.S. Application Data

(60) Provisional application No. 60/828,473, filed on Oct. 6, 2006.

(51) Int. Cl.
*B60G 9/00* (2006.01)
(52) U.S. Cl. ............................... 280/124.164
(58) Field of Classification Search .......... 280/124.164, 280/124.169; 267/292, 294, 140.11, 141.1, 267/141.2; 180/9.5, 9.52, 9.54
See application file for complete search history.

(56) References Cited

U.S. PATENT DOCUMENTS

| | | | |
|---|---|---|---|
| 2,786,724 A | 3/1957 | Armington et al. |
| 2,936,841 A | 5/1960 | Mazzarins |
| 2,988,159 A | 6/1961 | Weber |
| 3,096,840 A | 7/1963 | Mazzarins |
| 3,576,226 A | 4/1971 | Copeland |
| 3,666,301 A | 5/1972 | Jorn |
| 3,825,074 A | 7/1974 | Stedman et al. |
| 3,826,325 A | 7/1974 | Purcell et al. |
| 3,872,941 A | 3/1975 | Copeland |
| 3,889,769 A | 6/1975 | Blomstrom et al. |
| 4,018,295 A | 4/1977 | Hasselbacher |
| 4,073,047 A | 2/1978 | Fishbaugh et al. |
| 4,119,157 A | 10/1978 | Schuck et al. |
| 4,232,754 A | 11/1980 | Corrigan et al. |
| 4,364,443 A | 12/1982 | Sato et al. |
| 4,385,673 A | 5/1983 | Olt |
| 4,553,760 A | 11/1985 | Reed et al. |
| 4,690,231 A | 9/1987 | Riml |
| 4,772,151 A | 9/1988 | Lammers et al. |
| 4,838,373 A | 6/1989 | Price et al. |
| 4,844,195 A | 7/1989 | Deli et al. |

(Continued)

FOREIGN PATENT DOCUMENTS

DE   10229753 A1   1/2004

(Continued)

OTHER PUBLICATIONS

PCT International Search Report and Written Opinion for PCT International Application No. PCT/US07/80693.

*Primary Examiner*—Faye M. Fleming
(74) *Attorney, Agent, or Firm*—Edward F. Murphy

(57) ABSTRACT

A vehicle suspension system for large vehicles includes at least one elastomeric bearing. The bearing includes at least one substantially cylindrical elastomeric portion, at least one substantially frustospherical elastomeric portion, and at least one non-extensible shim disposed between and bonded to the substantially cylindrical elastomeric portion and the substantially frustospherical elastomeric portion.

23 Claims, 27 Drawing Sheets

U.S. PATENT DOCUMENTS

| | | |
|---|---|---|
| 5,033,722 A | 7/1991 | Lammers |
| 5,482,121 A | 1/1996 | Draney et al. |
| 5,887,859 A | 3/1999 | Hadano |
| 6,125,539 A | 10/2000 | Ogawa et al. |
| 6,298,933 B1 | 10/2001 | Simmons |
| 6,854,723 B2 | 2/2005 | Ogawa et al. |
| 6,926,611 B2 | 8/2005 | Rivin |
| 2005/0145397 A1 | 7/2005 | Michael |

FOREIGN PATENT DOCUMENTS

| | | |
|---|---|---|
| EP | 0111108 A2 | 6/1984 |
| EP | 0226702 A | 7/1987 |
| EP | 1238897 A | 9/2002 |
| FR | 2634839 A | 2/1990 |
| GB | 2369174 A | 5/2002 |
| GB | 2417054 A | 2/2006 |
| WO | 02/12748 A1 | 2/2002 |
| WO | 2004/052714 A1 | 6/2004 |
| WO | 2004052714 A1 | 6/2004 |

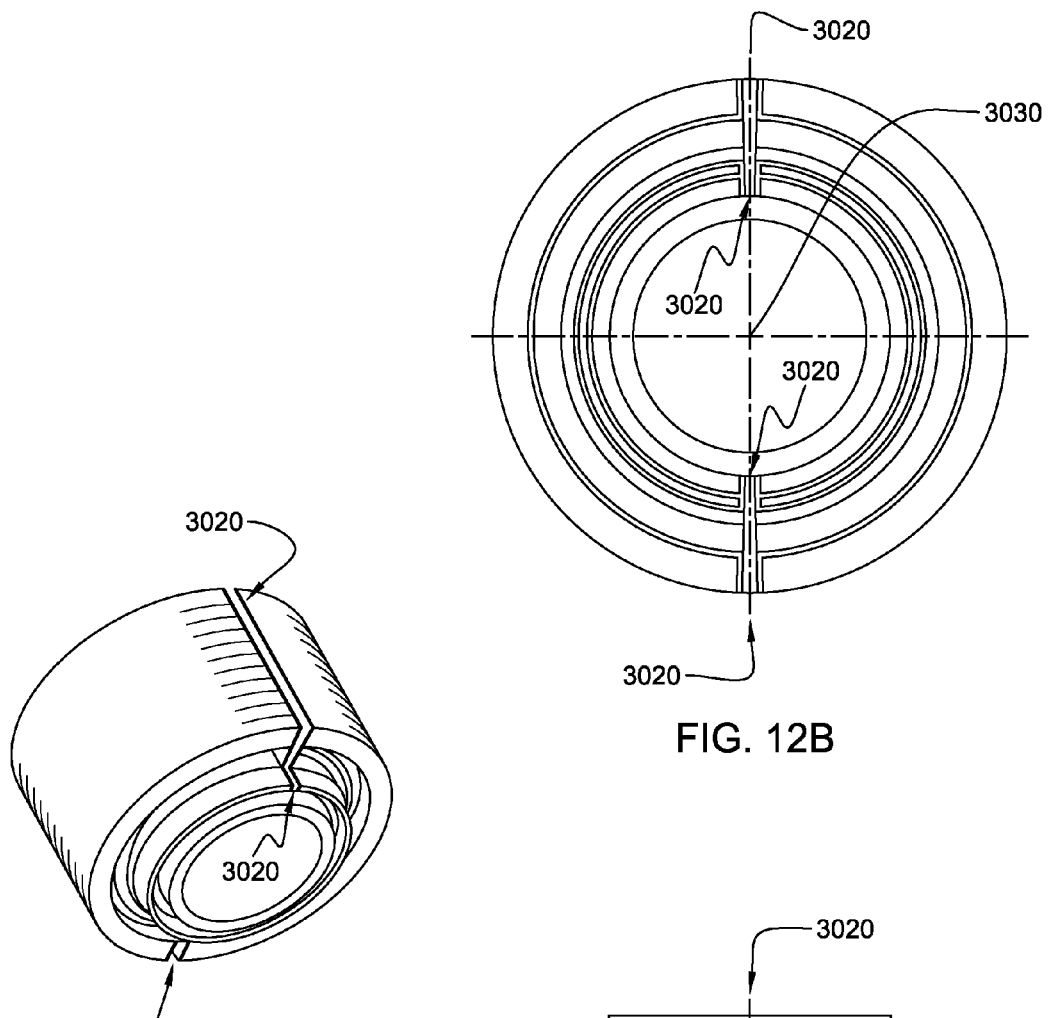
FIG. 12B
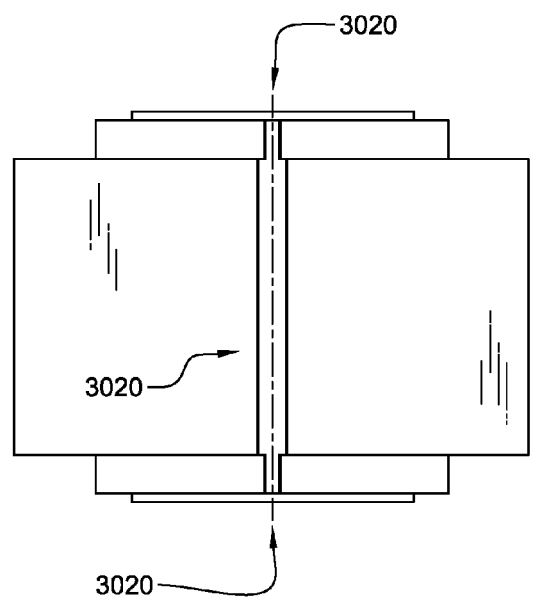
FIG. 12A
FIG. 12C

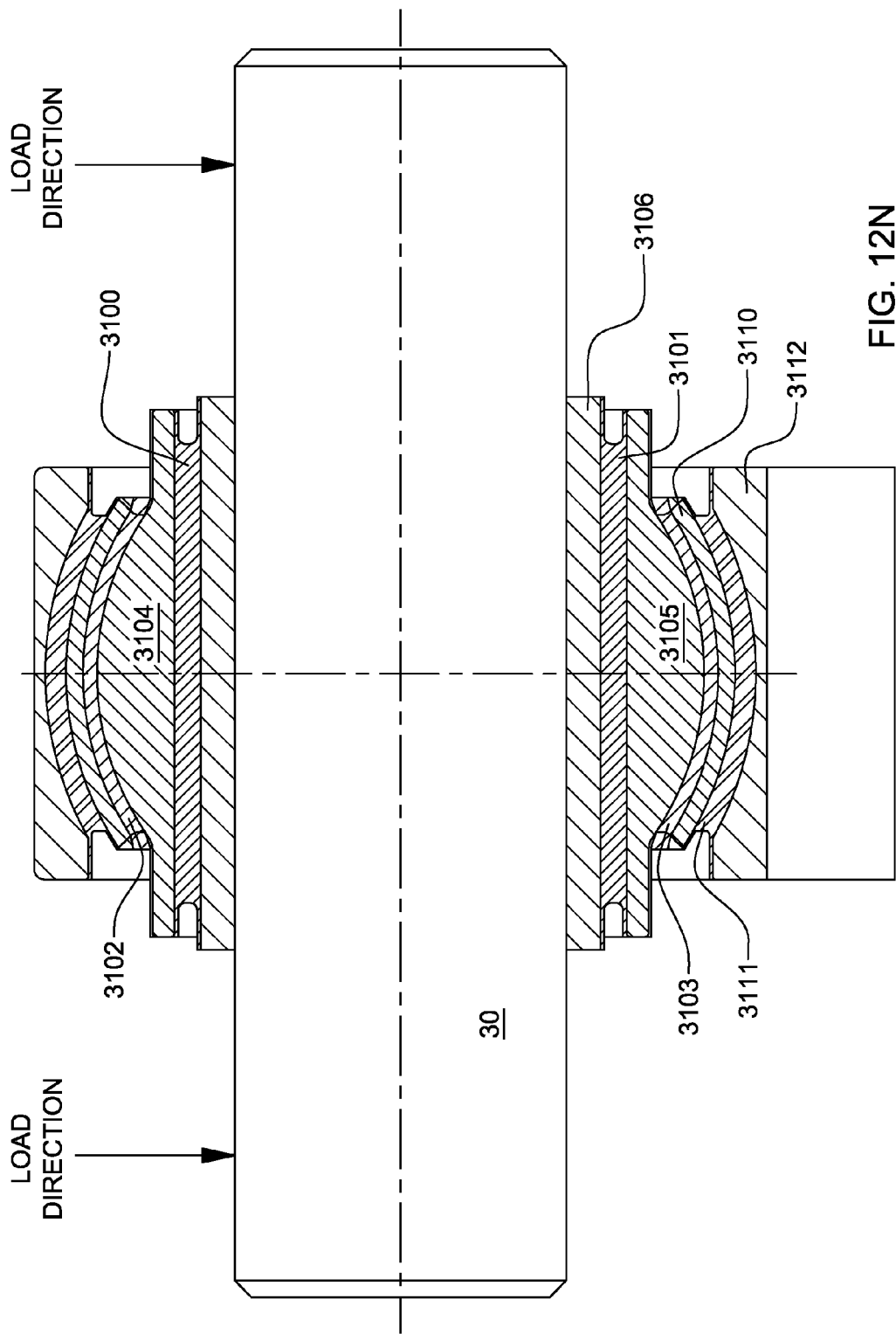

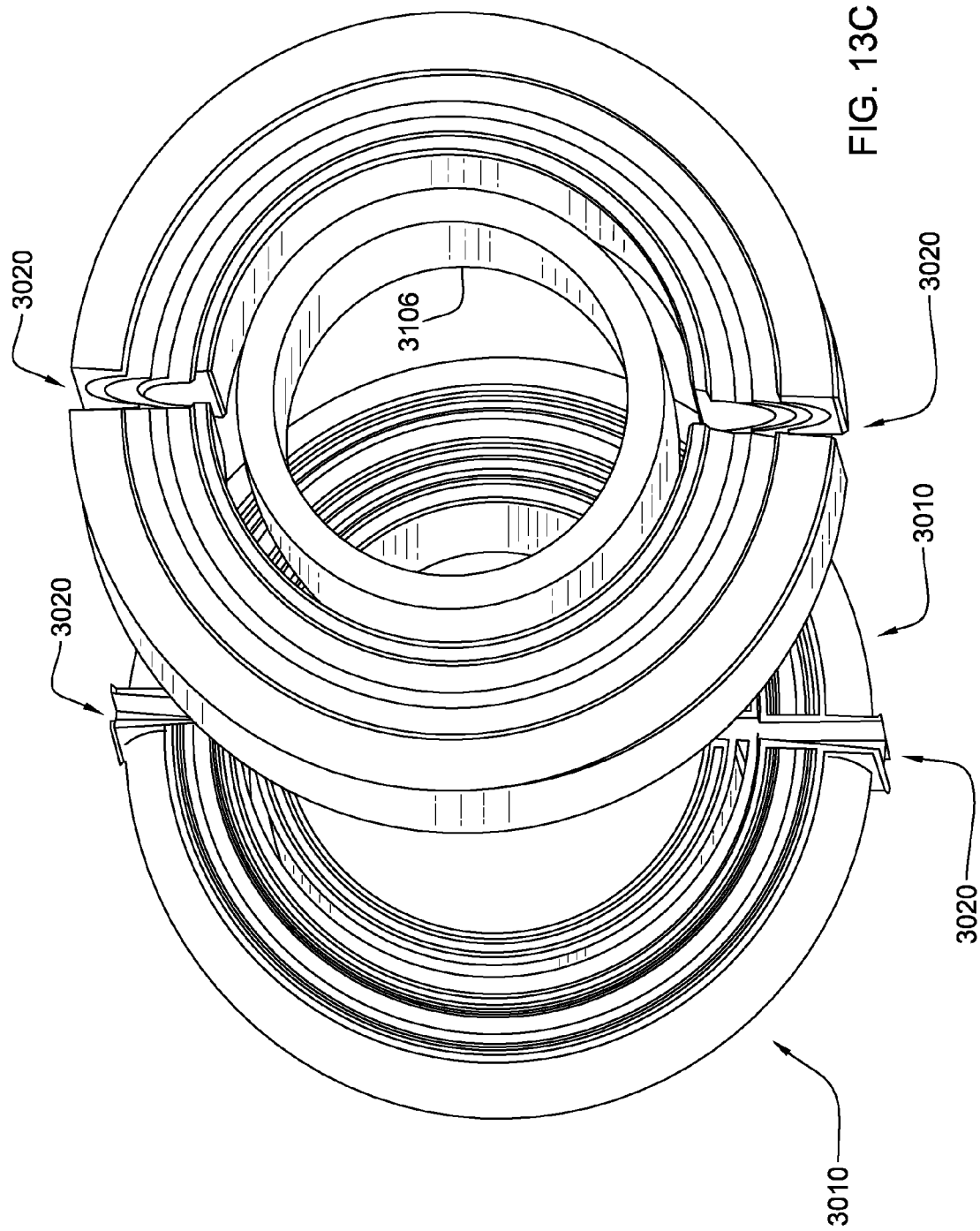

VEHICLE WITH ELASTOMERIC BEARING SUSPENSION SYSTEM AND ELASTOMERIC BEARING THEREFOR

CROSS REFERENCE

This Application claims priority to U.S. Provisional Patent Application 60/828,473 filed on Oct. 6, 2006 which is hereby incorporated by reference.

FIELD OF THE INVENTION

The invention is directed to suspension systems for large vehicles such as tracked earth-moving vehicles. More particularly, the invention is directed to a vehicle suspension system having at least one elastomeric bearing.

BACKGROUND INFORMATION

Tractors and other large earth-moving vehicles (referred to herein as "dozers" or "tracked vehicles") often include an equalizer link that connects the dozer's cab structure to its moving tracks or wheels. The equalizer link acts to substantially equally laterally distribute a dozer's weight between the dozer's tracks or wheels. The equalizer link typically includes a beam constructed of hot-rolled or forged steel. Bearings are used to pivotally connect the equalizer link to the dozer's cab. In addition, bearings in each end of the equalizer link are used to pivotally connect each end of the equalizer link to a roller frame assembly that includes the dozer's moving tracks or wheels. The end bearings accommodate relative movements between the equalizer link and the roller frame assemblies. The end bearings typically are constructed of hardened steel that can be subject to substantial wear and degradation during dozer operation. Although the end bearings are sealed and lubricated, the bearings can ultimately fail and require replacement after about 1,000-3,000 hours of dozer operation. Such bearing failure can result from unavoidable exposure to dirt, mud, and debris, which adversely effect the bearings' lubrication.

When the end bearings fail, articulation of the associated joints is restricted, and ultimately can lead to a failure of the end joints of the equalizer link. Typically, such bearing failure necessitates costly repair of the retaining ring grooves, seals, and/or bores of the end joints of the equalizer link. For example, a major repair of the equalizer link end joints can cost several thousand dollars, and typically removes a dozer from service for about one week. In order to minimize the possibility of bearing failure, conventional lubricated end bearings must be regularly inspected, lubricated, and otherwise maintained.

Based on the foregoing, there is a need for a dozer equalizer link end bearing that requires less maintenance and is less prone to failure than lubricated steel bearings. In particular, there is a need for an elastomeric end bearing assembly for use in connecting the ends of a dozer equalizer link to its roller track frames.

SUMMARY OF THE INVENTION

The invention includes a tracked vehicle suspension system including at least one elastomeric bearing assembly. The elastomeric bearing assembly can include a substantially cylindrical outer member, a substantially cylindrical elastomeric portion coupled to the cylindrical outer member, and a shim coupled to the substantially cylindrical elastomeric portion. The elastomeric bearing assembly can further include a substantially frustospherical elastomeric section coupled to the shim, and an inner member coupled to the frustospherical elastomeric portion.

The invention also includes a tracked vehicle suspension system that includes at least one elastomeric bearing. The elastomeric bearing can include at least one substantially cylindrical elastomeric portion, at least one substantially frustospherical elastomeric portion, and at least one metal shim disposed between and bonded to the substantially cylindrical elastomeric portion and the substantially frustospherical elastomeric portion.

The invention further includes a tracked vehicle. The vehicle can include a first moving track roller frame assembly, and a second moving track roller frame assembly. The vehicle also can include an equalizer link coupled to the first and second moving track roller frame assemblies. The link can include a first end portion and a second end portion, and a first elastomeric bearing at least partially coupling the first end portion to the first moving track roller frame assembly. The bearing can include at least one substantially cylindrical elastomeric portion, at least one substantially frustospherical elastomeric portion, and at least one metal shim disposed between and bonded to the substantially cylindrical elastomeric portion and the substantially frustospherical elastomeric portion.

In an embodiment the invention includes a tracked vehicle suspension system that includes at least one elastomeric bearing with at least a first substantially cylindrical inner elastomeric portion, at least a first substantially frustospherical outer elastomeric portion, and at least a first nonelastomeric nonextensible shim disposed between and bonded to the substantially cylindrical inner elastomeric portion and the first substantially frustospherical outer elastomeric portion. Preferably the at least one elastomeric bearing includes at least a second substantially frustospherical outer elastomeric portion, and at least a second outer nonelastomeric nonextensible shim disposed between and bonded to the first substantially frustospherical elastomeric portion and the second substantially frustospherical elastomeric portion.

These and other aspects of the invention will be understood from a reading of the following description together with the drawings. It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 13A-F illustrate an embodiment of an elastomeric bearing assembly for use in a pinned connection such as shown in FIGS. 4 and 5 with the elastomeric bearing assembly including two frustospherical elastomeric portions concentrically disposed around the cylindrical elastomeric portion, including exploded views with the elastomeric portions removed to show the nonelastomeric members.

DETAILED DESCRIPTION

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

One embodiment of the present invention is an elastomeric bearing assembly for use in conjunction with an equalizer link of a tractor or other earth-moving vehicle. The elastomeric bearing assembly includes both a spherical and cylindrical rubber layer.

Figure 1:
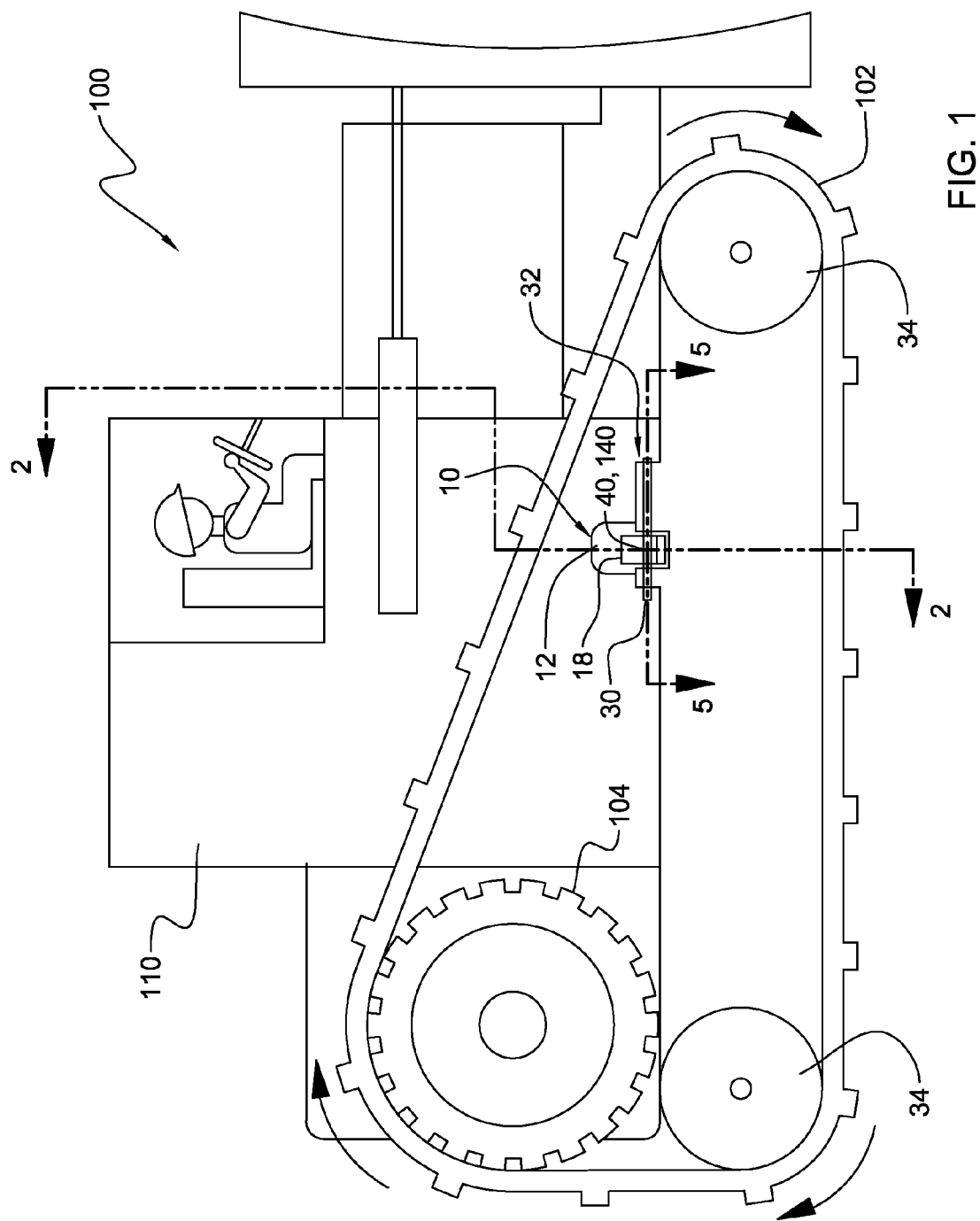
FIG. 1 is a side elevation view of a tracked earth-moving vehicle having a suspension system according to the invention.
Figure 2:
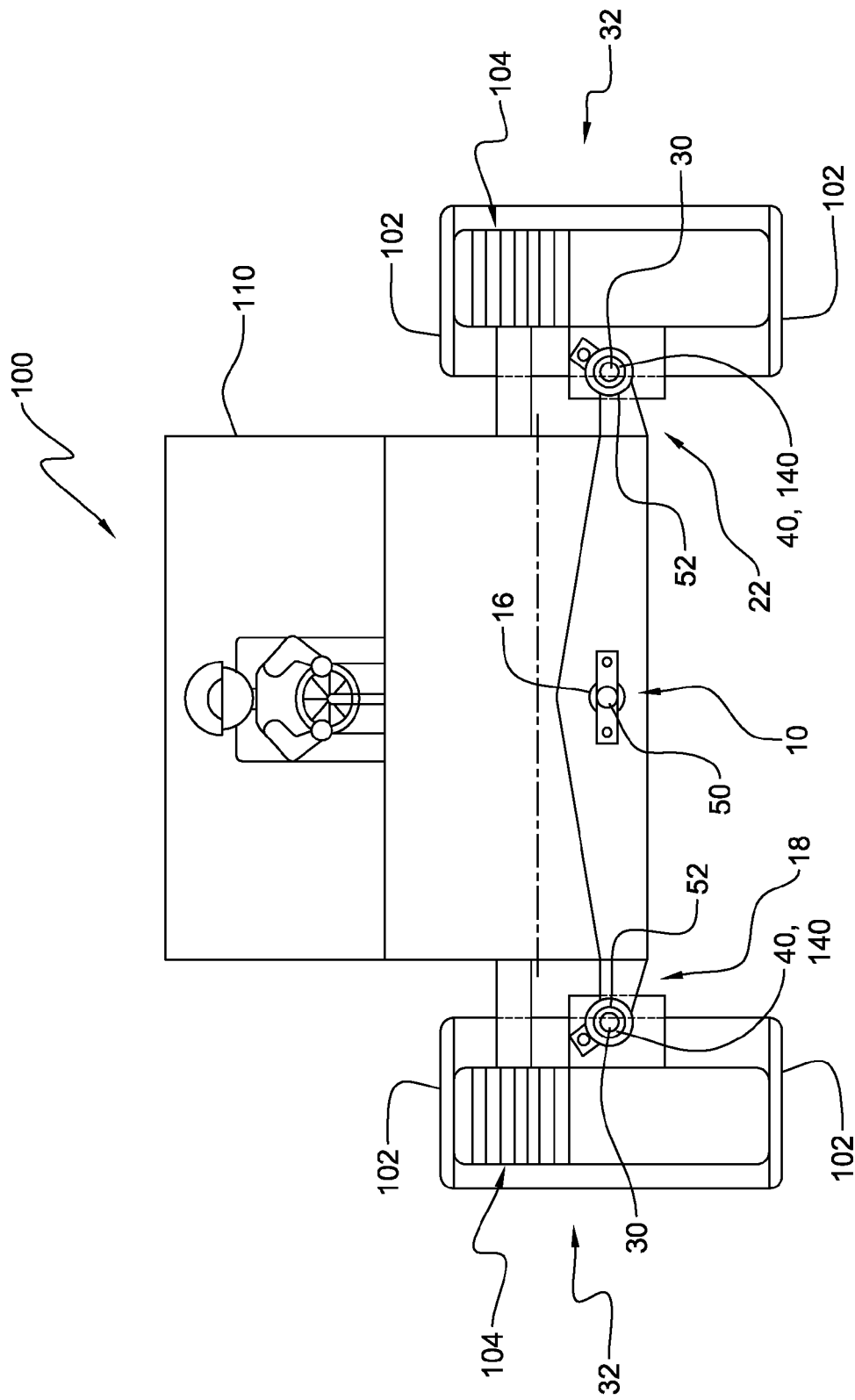
FIG. 2 is a cross-sectional view of the tracked earth-moving vehicle of FIG. 1 taken along line 2-2 in FIG. 1.

FIG. 1 and FIG. 2 show a dozer 100 equipped with elastomeric equalizer link end bearings according to the invention. The dozer 100 includes tracks 102 driven by sprockets 104 around wheels 34 mounted on track roller frames 32. As shown in FIG. 2, the dozer 100 includes a pair of opposed track roller frame assemblies 32, each connected to one end of an equalizer link 10. The equalizer link 10 has opposed end portions, 18 and 22, each having a substantially circular bore 52 extending therethrough. An elastomeric end bearing assembly 40 is disposed within each of the bores 52. As shown in FIG. 1, each end bearing 40 receives a pin 30 that also engages portions of an associated track roller frame 32, thereby pivotally connecting each end 18, 22 of the equalizer link 10 to one of the roller frames 32. As shown in FIG. 2, the equalizer link 10 is connected at its center portion 14 to the dozer cab 110 by a center pin 50 received in a center bearing 16.

Figure 3:
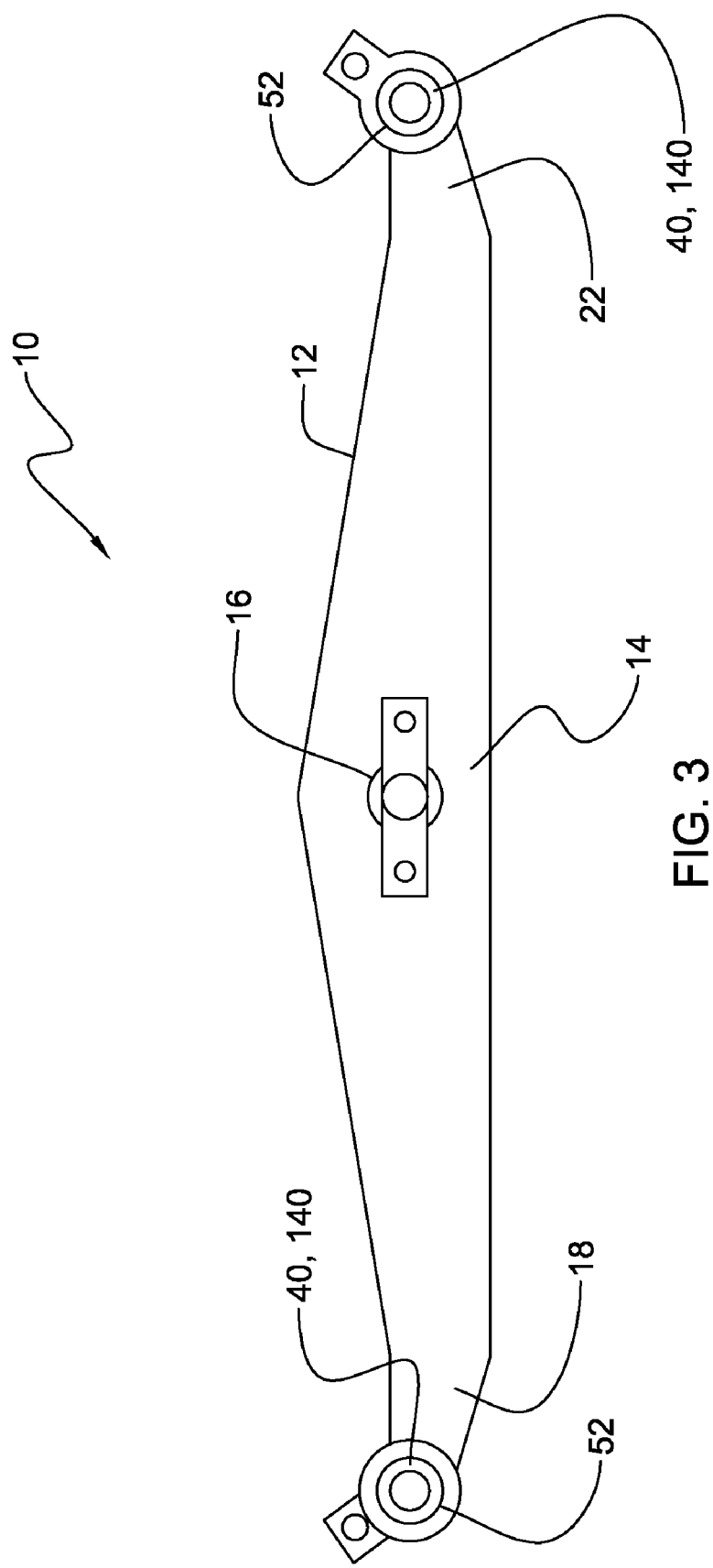
FIG. 3 is a front elevation view of an equalizer link portion of the tracked earth-moving vehicle shown in FIGS. 1 and 2.

FIG. 3 is a front view of the equalizer link 10. Equalizer link 10 includes an elongated beam 12. The center portion 14 of the beam 12 includes a cylindrical center bearing 16. FIG. 3 also shows elastomeric end bearings 40 disposed within bores 52 in the end portions 18, 22 of the beam 12. The bearings 16, 40 provide means for pivotally connecting the link 10 to the dozer cab 110, and pivotally connecting each roller track assembly 32 to the ends of the equalizer link 10. Such pivotal connections permit articulated relative movement between the cab 110, the equalizer link 10, and the roller tracks 32 as a dozer traverses an uneven or irregular surface.

Figure 4:
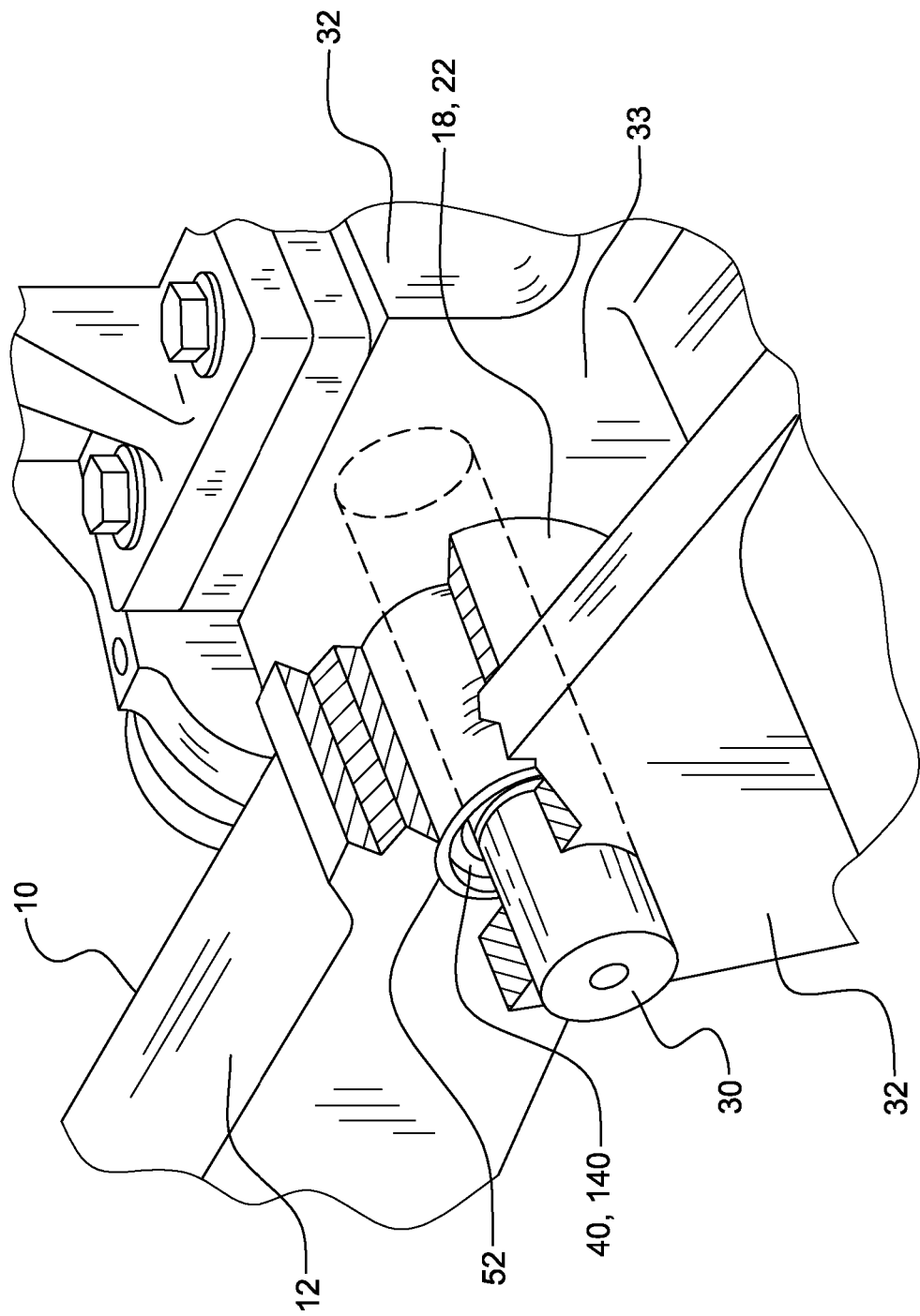
FIG. 4 is a perspective view showing a pinned connection between an end portion of the equalizer link of FIG. 3 connected to a moving track frame of the tracked earth-moving vehicle shown in FIGS. 1 and 2.

FIG. 4 is a perspective view of one end of an equalizer link 10 connected to a roller track assembly 32. In FIG. 4, portions of the roller track assembly are broken away to reveal inner details of the connection. As shown in FIG. 4, each end portion 18, 22 of the equalizer link 10 is attached to a roller frame assembly 32 by an elongated pin 30 that extends through an end bearing 40 and through opposed portions of the roller frame 32. In one embodiment, the end bearing 40 has a slightly larger outer diameter than the bore 52 in the equalizer link 10, and is tightly and securely pressed into the bore 52. In addition, the pin 30 can have an outer diameter that is slightly larger than an inner bore diameter of the bearing 40, and can be tightly and securely pressed into the inner bore of the bearing 40.

Figure 5:
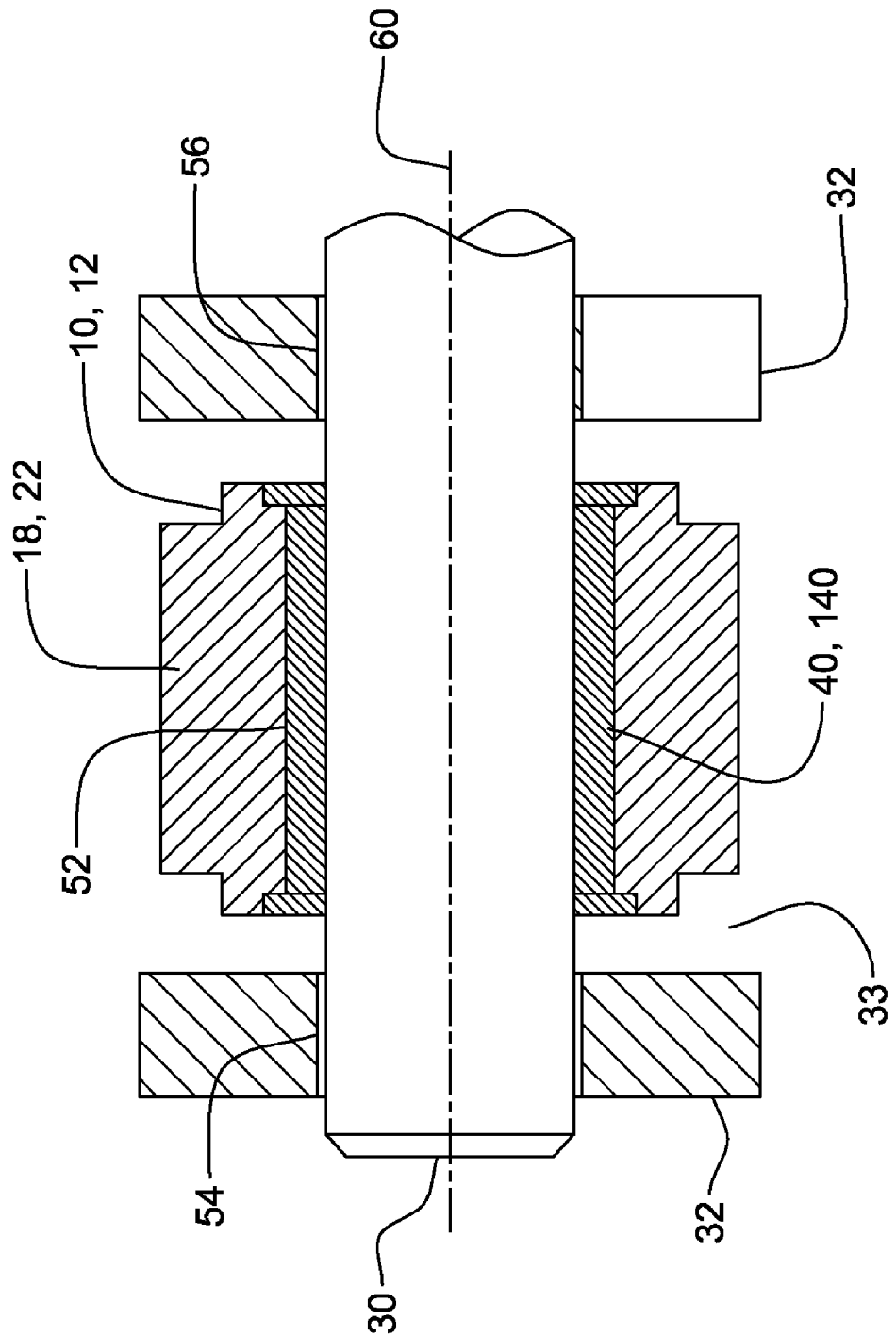
FIG. 5 is a cross-sectional view of the pinned connection shown in FIG. 4 taken along FIG. 5-5 in FIG. 1.

FIG. 5 is a cross-sectional view of an equalizer link/track frame connection like that shown in FIG. 4. As shown in FIG. 5, in one embodiment, an elastomeric bearing assembly 40 can be disposed within a substantially circular bore 52 extending through an end portion 18, 22 of the beam 12 of equalizer link 10. A pin 30 extends through the bore 52, and through opposed first and second substantially circular openings 54, 56 that extend through opposed portions of the roller frame assembly 32. The end portion 18, 22 of the equalizer link 10 is movably received within a space or gap 33 between the opposed portions of the track roller frame 32. The pin 30 connects the end portion 18, 22 to the frame 32, and permits at least some relative rotational displacement between the end portion 18, 22 and frame 32 about substantially coincident longitudinal axes 60 of the pin 30 and bores 54, 56. As shown in FIG. 5, lateral clearances can be provided between the opposed frame portions 32 and the end portions 18, 22 of the equalizer link 10 to permit at least some relative movement between the end portion 18, 22 and frame 32 in a direction that is parallel to the axis 60 of the pin 30.

Figure 6:
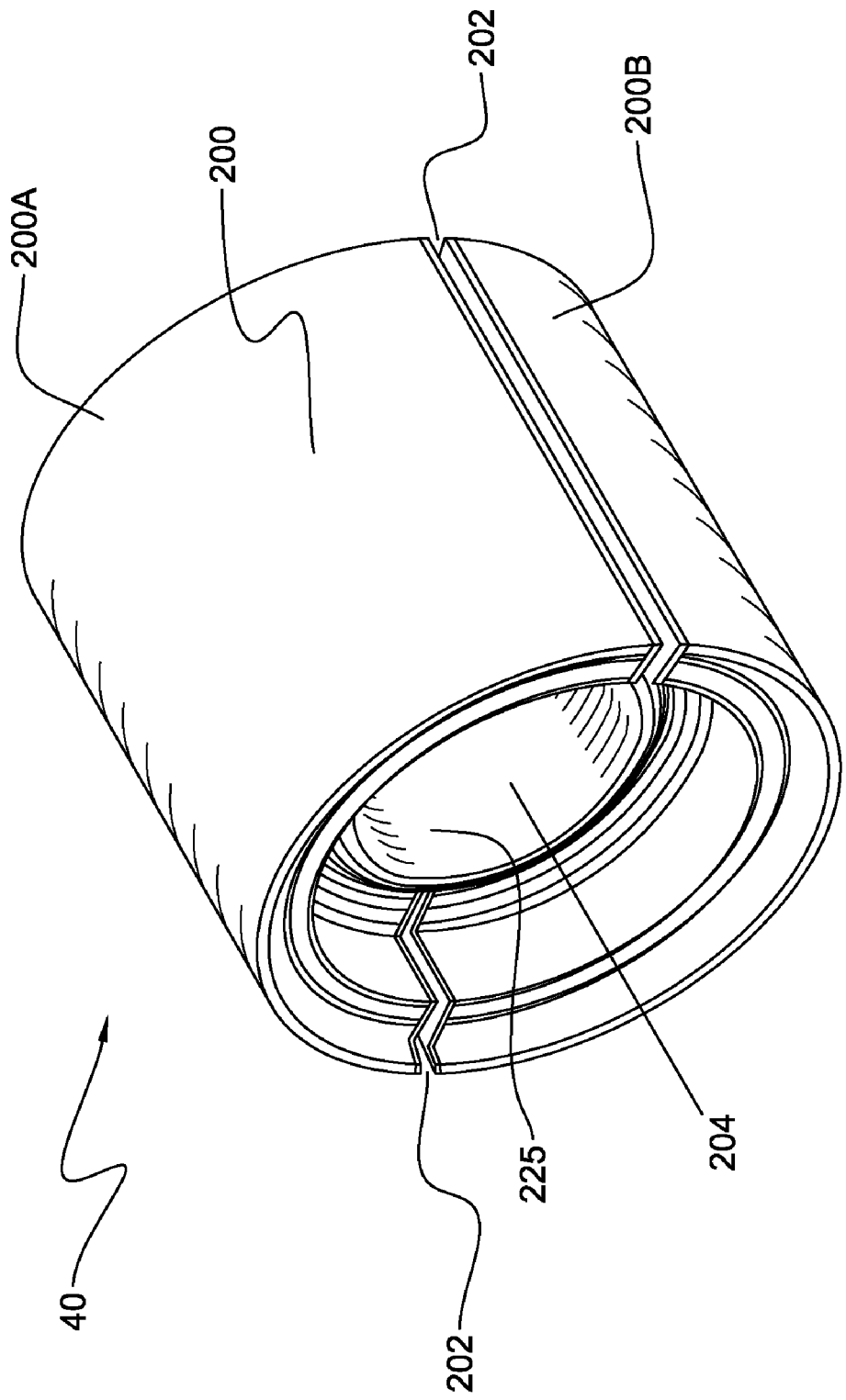
FIG. 6 is a perspective view of one embodiment of an elastomeric bearing portion of the pinned connection shown in FIGS. 4 and 5.
Figure 7:
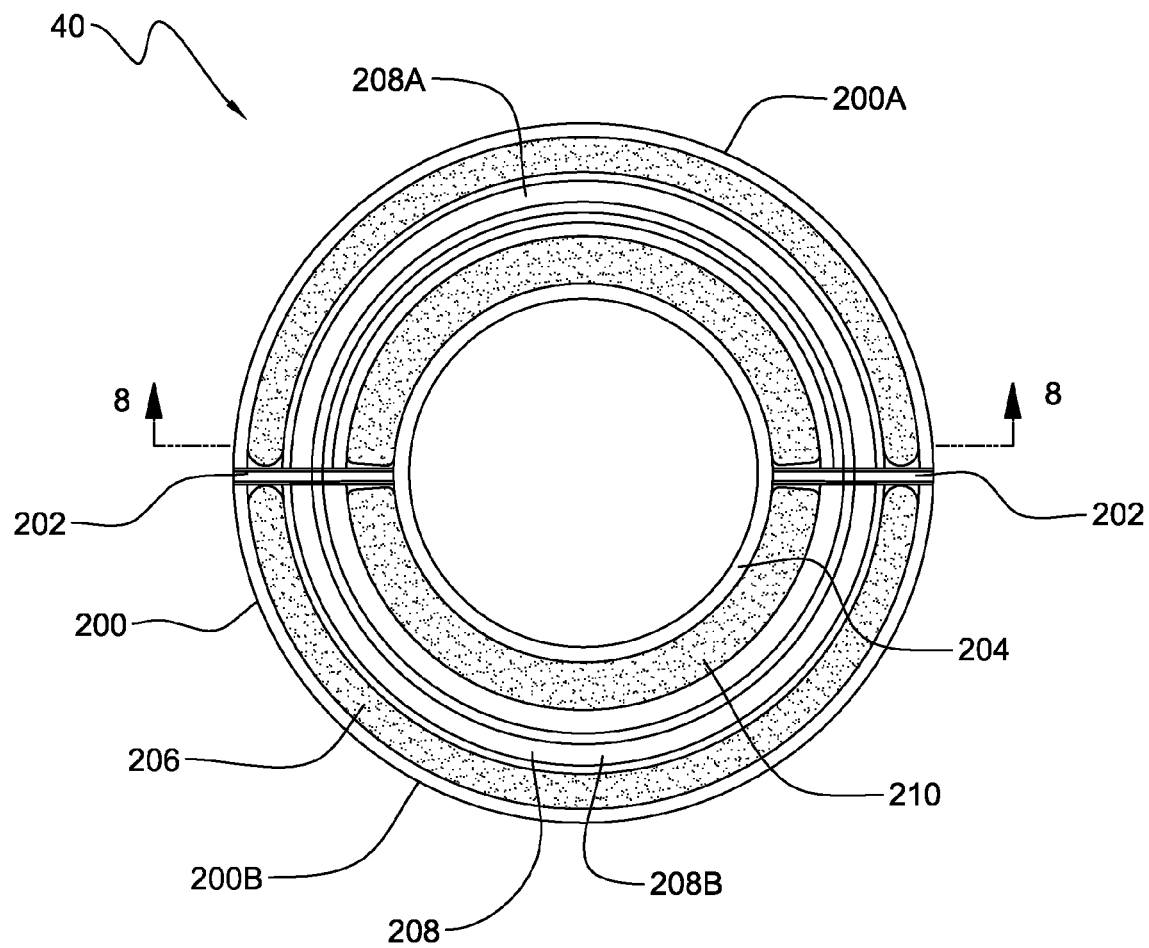
FIG. 7 is an end view of the elastomeric bearing shown in FIG. 6.

FIGS. 6-9 show one embodiment of an elastomeric end bearing 40 for a dozer equalizer link 10 according to the invention. As shown in FIG. 7, the bearing 40 includes an inner member 204 and an outer sleeve 200. The inner member 204 includes a central bore 225 for receiving a pin 30 like that shown in FIG. 5. As shown in FIG. 6, the outer sleeve 200 is substantially cylindrical, and can include one or more axial slits 202 along its length. In the embodiment shown in FIG. 7, the outer sleeve 200 includes two diametrically opposed axial slits 202 that symmetrically divide the outer sleeve into first and second portions 200A, 200B. The outer sleeve 200 has an outer diameter sized to be tightly and securely received in a mating bore 52 in an equalizer link 10, such as by mechanically pressing the outer sleeve 200 and end bearing 40 into the bore 52 with a hydraulic ram or the like. The outer sleeve 200 can be constructed of metal such as steel, a metal alloy, a composite material, or any other suitable substantially rigid and non-extensible solid material. Preferably the non-extensible nonelastomeric members of the bearing remain substantially unaltered in size and shape under applied load conditions, particularly when compared to the temporary and recoverable deformations experienced by the elastomeric layers and elastomers under substantially identical load conditions, most preferably with the nonextensible nonelastomeric members formed from a metal.

Figure 8:
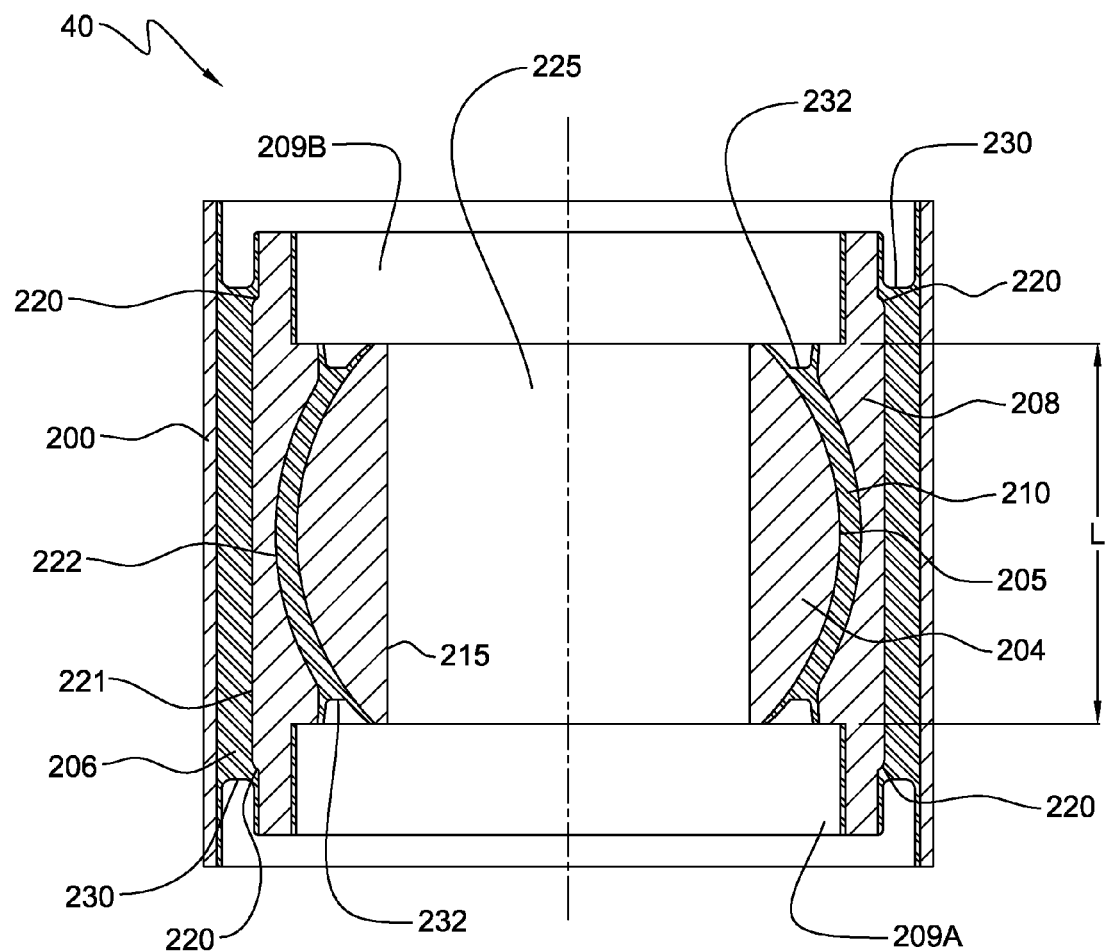
FIG. 8 is a longitudinal cross-sectional view of the bearing shown in FIGS. 6 and 7 taken along line 8-8 in FIG. 7.

As shown in FIGS. 7 and 8, the inner member is concentrically supported within the outer sleeve 200 by a plurality of concentrically arranged layers or members 206, 221, and 222. As shown in FIG. 8, the inner member 204 can have a substantially frustospherical outer surface 205, and a substantially cylindrical inner surface 215 defining central bore 225. The diameter of the cylindrical inner surface 215 can be sized to provide tight and secure engagement with a mating pin 30 like that shown in FIG. 5. The inner member 204 can be constructed of a metal such as steel, a metal alloy, a composite material, or any other suitable substantially rigid and non-extensible solid material. As shown in FIG. 8, the inner member 204 can have a length "L" that is shorter than the length of the outer sleeve 200, and can be substantially centrally axially disposed within the outer sleeve 200.

As shown in FIG. 8, a shim 208 is concentrically disposed between the outer sleeve 200 and the inner member 204. In the embodiment shown in FIG. 8, the shim 208 has a substantially cylindrical outer surface 221 and a substantially frustospherical inner surface 222. The shim 208 can be constructed of a metal such as steel, a metal alloy, a composite material, or any other suitable substantially rigid and non-extensible solid material. As shown in FIG. 8, the shim 208 can be shorter in length than the outer sleeve 200, and longer in length than length "L" of the inner member 204. The shim 208 can include counterbores 209A, 209B on its ends that combine to define a central portion having an axial length that is substantially equal to the length "L" of the inner member 204.

As shown in FIG. 8, the bearing 40 can include a first elastomeric layer 210 concentrically disposed between the frustospherical outer surface 205 of the inner member 204 and the frustospherical inner surface of the shim 208. In the embodiment shown, the first elastomeric layer 210 has a substantially frustospherical shape. The first elastomeric layer 210 can be constructed of rubber or another suitable elastomeric material. In one embodiment, the first elastomeric layer 210 is composed of a natural rubber elastomer. Also shown in FIG. 8, the bearing 40 can include a second elastomeric layer 206 concentrically disposed between the substantially cylindrical outer surface 221 of the shim 208 and the substantially cylindrical inner surface of the outer sleeve 200. The second elastomeric layer 206 can be constructed of rubber or another suitable elastomeric material. In one embodiment, the second elastomeric layer 206 is a natural rubber elastomer. Preferably, the first elastomeric layer 210 and the second elastomeric layer 206 are constructed of the same natural rubber material.

Adjacent portions of the first elastomeric layer 210 can be respectively tightly bonded to the inner surface 222 of the shim 208, and to the outer surface 205 of the inner member 204. Similarly, adjacent portions of the second elastomeric layer 206 can be respectively tightly bonded to the outer surface of the shim 208 and to the inner surface of the outer sleeve 200. The elastomeric layers 210, 206 can be molded between the inner member 204, shim 208, and outer sleeve 200 after coating the affected surfaces of the inner member 204, shim 208, and outer sleeve 200 with a suitable adhesive.

Figure 9:
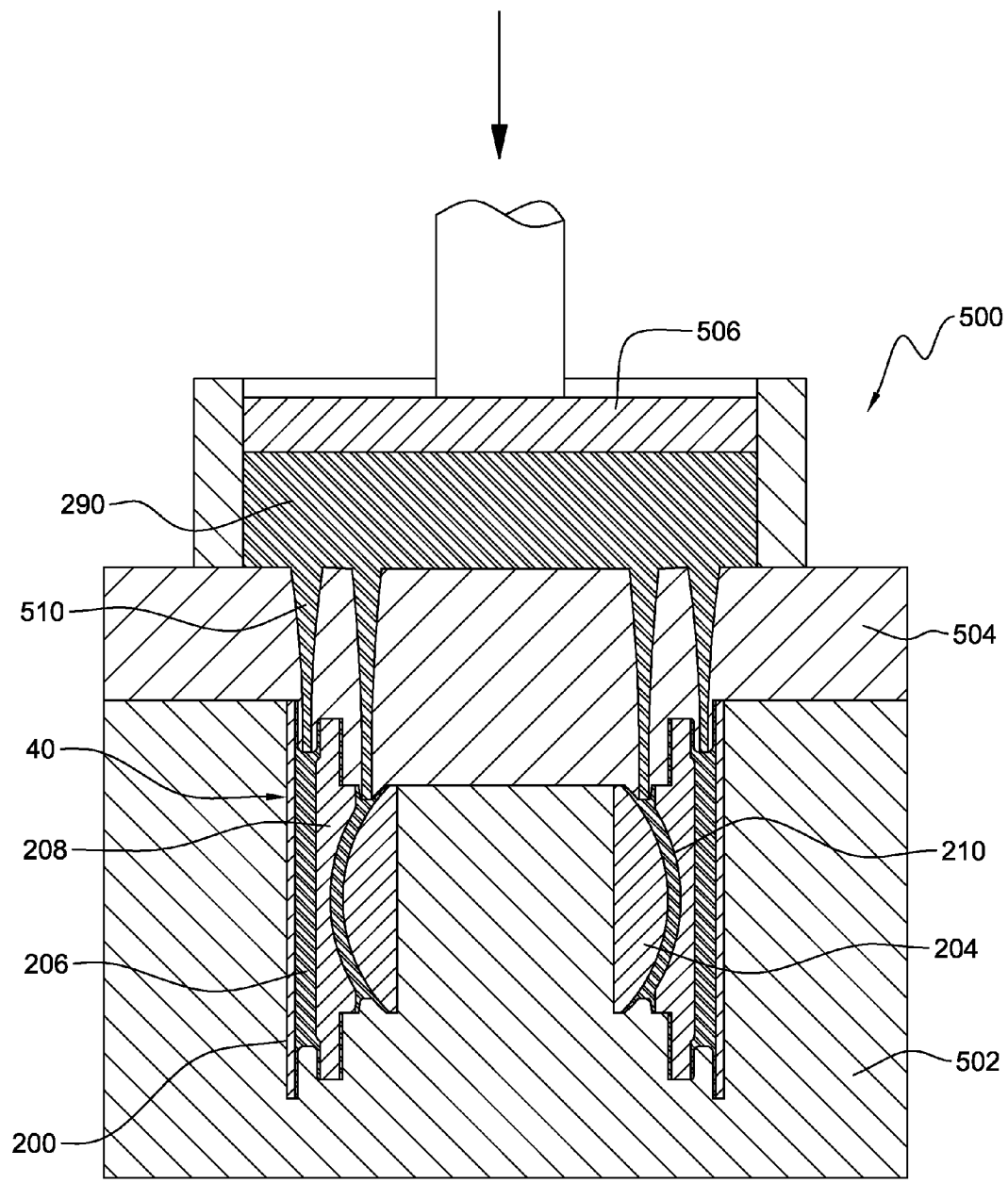
FIG. 9 is a cross-sectional view of a mold for bond-molding elastomeric layers between the non-extensible, non-elastomeric portions of a bearing like that shown in FIG. 8.

Adjacent portions of the first elastomeric layer 210 can be respectively securely bonded to the inner surface 222 of the shim 208, and to the outer surface 205 of the inner member 204. Similarly, adjacent portions of the second elastomeric layer 206 can be respectively securely bonded to the outer surface of the shim 208 and to the inner surface of the outer sleeve 200. As shown in FIG. 9, the elastomeric layers 210, 206 can be molded between the inner member 204, the shim 208, and the outer sleeve 200. As shown in FIG. 9, the elastomeric layers 210, 206 can be mold-bonded to the adjacent contacting surfaces of the non-elastomeric and non-extensible inner member 204, shim 208, and outer sleeve 200 using a suitable mold 500. As shown in FIG. 9, the mold 500 can include a lower portion 502 and an upper portion 504 that combine to hold and position the non-elastomeric bearing members 200, 204, 208 in concentric relationship. Before placing the outer sleeve 200, the inner member 204 and the shim 208 in the mold 500 and before injecting the uncured elastomeric material 290 therebetween, the surfaces of the members 204, 208, and 200 that will contact the elastomeric material 290 are thoroughly cleaned. In addition, a suitable elastomer-to-substrate adhesive (such as a suitable rubber-to-metal adhesive, for example) is applied to the clean contacting surfaces of the members 204, 208, and 200 before molding. A quantity of uncured elastomeric material 290 is pressed and transferred into the mold 500 through a plurality of sprues or inlets 510, thereby causing the uncured elastomeric material 290 to flow into and fill the interstices or voids between the inner member 204 and shim 208, and between the shim 208 and outer sleeve 200. The elastomeric material 290 is then cured to yield a mold-bonded elastomeric bearing assembly 40 with elastomeric layers 206, 210 like that shown in FIG. 8.

As shown in FIG. 8, the second elastomeric layer 206 has a substantially cylindrical configuration that bears and accommodates torsional loads that are applied to the inner member 204 of the bearing 40 by a pin 30 borne within the bearing 40. Accordingly, the second elastomeric layer 206 is a torsional-load carrying elastomeric layer. Conversely, the first elastomeric layer 210 has a substantially spherical configuration that bears and tolerates cocking loads that are applied to the inner member 204 of the bearing 40 by a pin 30 borne within the bearing 40. Accordingly, the second elastomeric layer 206 is a cocking-load carrying elastomeric layer. Preferably, the bearing 40 includes at least one substantially frustospherical or spherical elastomeric layer 210 and at least one substantially cylindrical elastomeric layer 206 such that the bearing includes both at least one torsional-load carrying elastomeric layer and at least one cocking-load carrying elastomeric layer. Accordingly, the bearing 40 is operable to withstand a combination of cocking loads and torsional loads without failure. As a result, the bearing 40 is particularly well suited for use as an end bearing for an equalizer link 10 for a dozer 100 that typically is subjected to a combination of severe cocking loads and severe torsional loads.

Figure 10:
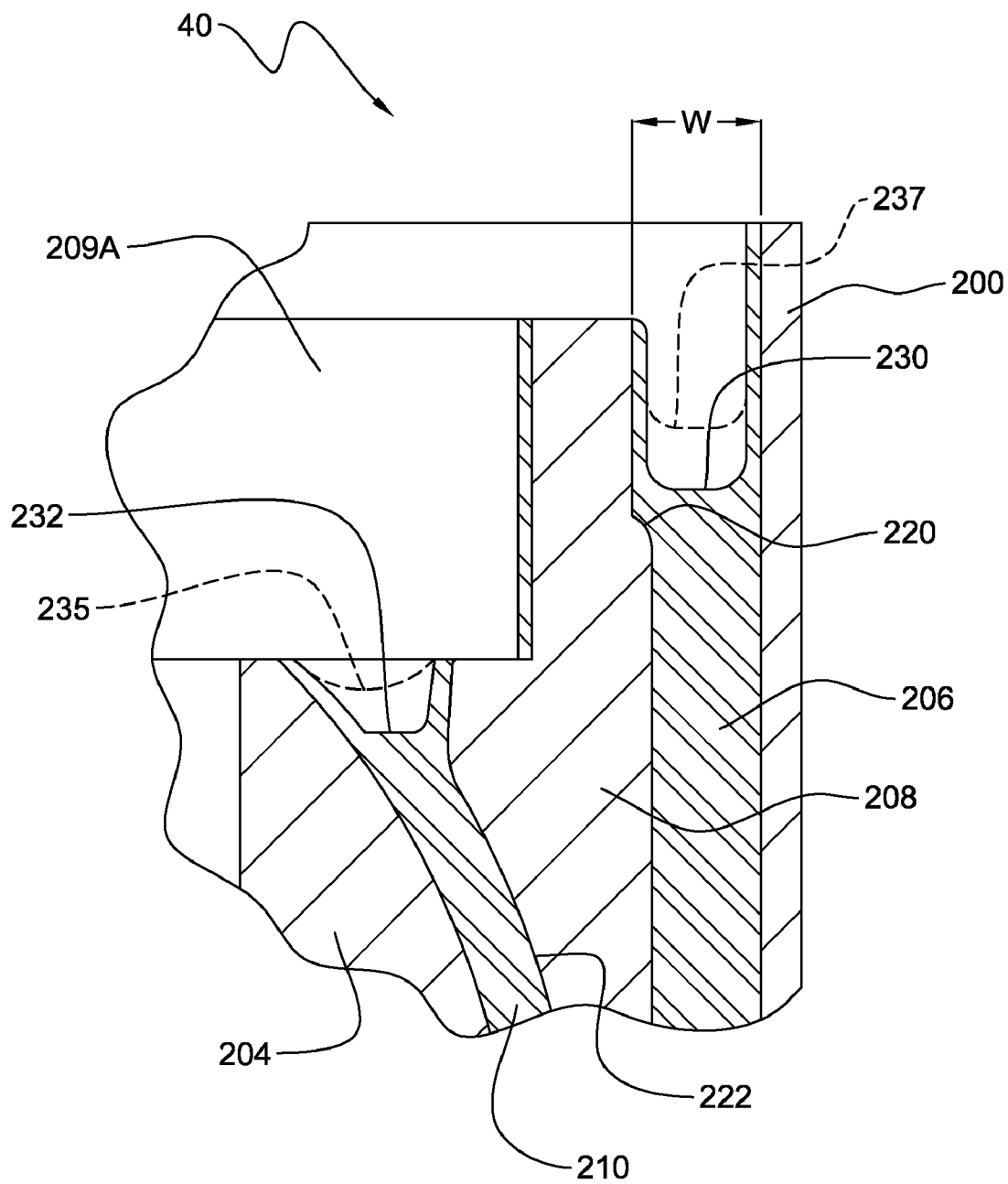
FIG. 10 is an enlarged detail view of the cross-section of FIG. 8.

FIG. 10 shows an enlarged view of a portion of the cross-sectional view of the elastomeric bearing 40 shown in FIG. 8. As shown in FIG. 10, the first elastomeric layer 210 includes a recessed, smoothly contoured annular end portion 232. The opposite end of the first elastomeric layer 210 can be substantially similarly shaped. When the first elastomeric layer 210 is compressed between the inner member 204 and shim 208 under certain load conditions, portions of the first elastomeric layer 210 respond by outwardly bulging in the region of the end portion 232. In FIG. 10, displacement of the surface of end portion 232 during bulging of the first elastomeric layer 210 is depicted by dashed line 235. The annular end portion 232 shown in FIG. 10 is configured such that the resulting shape factor minimizes peak stresses at the ends the first elastomeric layer 210 during such bulging conditions such that peak stresses do not exceed the limits of the elastomeric material. Generally, a wider annular end portion 232 will experience lower peak stresses than a narrower end portion 232 under identical bulge-producing load conditions.

As also shown in FIG. 10, the second elastomeric layer 206 similarly includes a recessed, smoothly contoured annular end portion 230. The opposite end of the second elastomeric layer 206 can be substantially similarly shaped. When the second elastomeric layer 206 is compressed between the outer sleeve 200 and shim 208 under certain load conditions, portions of the second elastomeric layer 206 respond by outwardly bulging in the region of the end portion 230. In FIG. 10, displacement of the surface of end portion 230 during bulging of the second elastomeric layer 206 is depicted by dashed line 237. The end portion 230 shown in FIG. 10 is configured to provide a shape factor that minimizes that peak stresses at the ends the second elastomeric layer 206 during such bulge-inducing load. As discussed above, generally speaking, a wider annular end portion 230 will experience lower peak stresses than a narrower annular end portion 230 under the identical bulge-producing load conditions. Referring to FIG. 10, in order to maximize the width "w" of the end portion 230 and minimize bulge-induced stresses in the end portion 230, the shim 208 can include a reduced-diameter end portion or "step" 220, thereby providing a wider annular gap and more desirable shape factor in the area of end portion 230.

As shown in FIG. 7, the first elastomeric layer 204, shim 208, and second elastomeric layer 206 can include diametrically opposed slits 202 that coincide with the slits 202 in the outer sleeve 200. When the bearing 40 is installed in an equalizer link 10, the bearing 40 typically is press fit into a mating circular bore 52. As the bearing 40 is pressed into the bore 52, the two halves 200A, 200B of the outer sleeve 200 are radially inwardly displaced such that the second elastomeric layer 206 is radially pre-compressed between the outer sleeve 200 and the shim 208. As the second elastomeric layer is pre-compressed, the two halves 208A, 208B of the shim 208 also are radially inwardly displaced such that the first elastomeric layer 210 is radially pre-compressed between the shim 208 and the inner member 204. In one embodiment, the uncompressed outer diameter of the bearing 40 is about 105% of the inner diameter of a receiving circular bore 52. Pre-compression of the elastomeric layers 206, 210 increases the effective load bearing capacity of the elastomeric layers.

Figure 11:
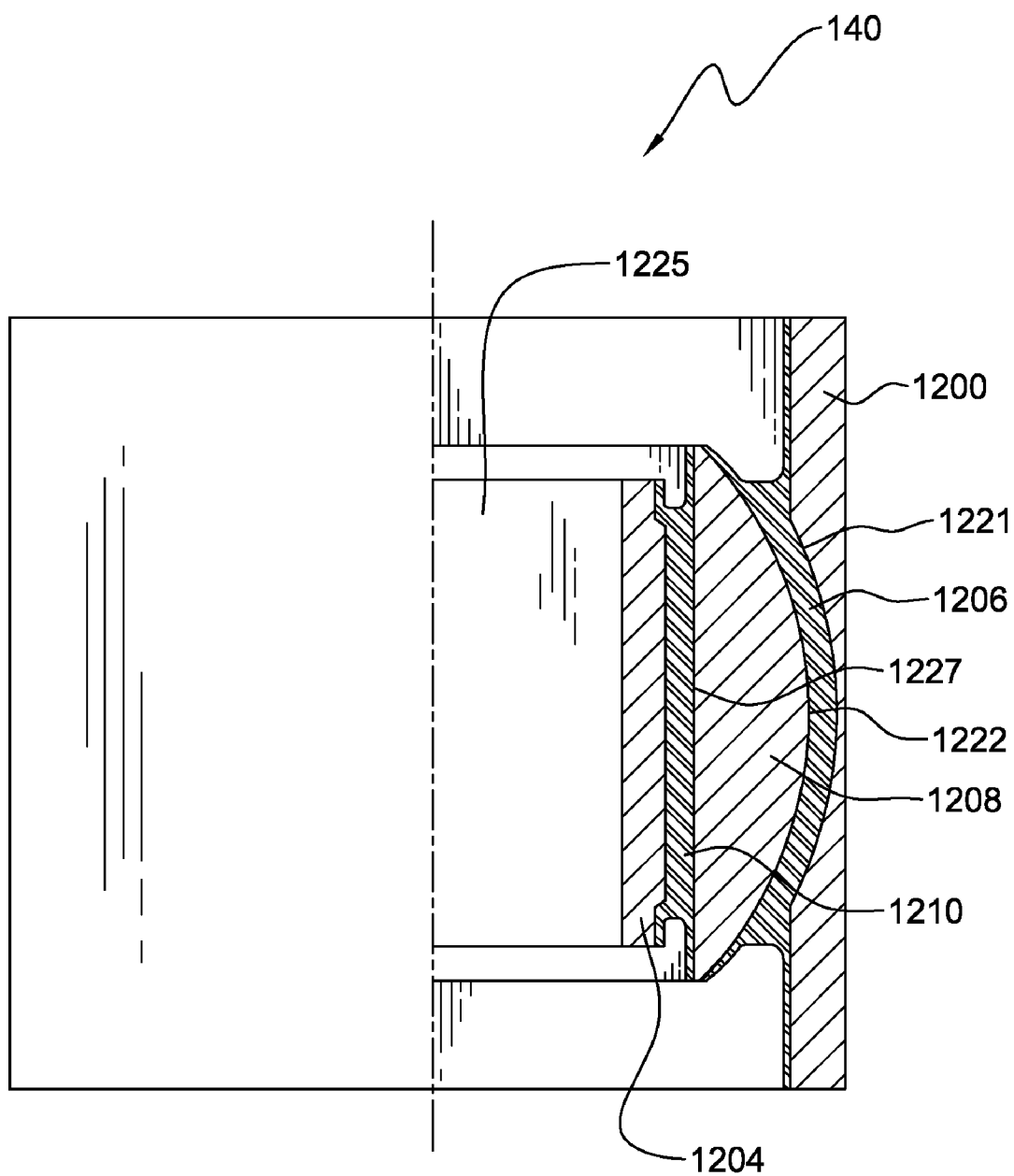
FIG. 11 is a partial longitudinal cross-sectional view of an alternative embodiment of an elastomeric bearing assembly for use in a pinned connection such as shown in FIGS. 4 and 5.
Figure 12D:
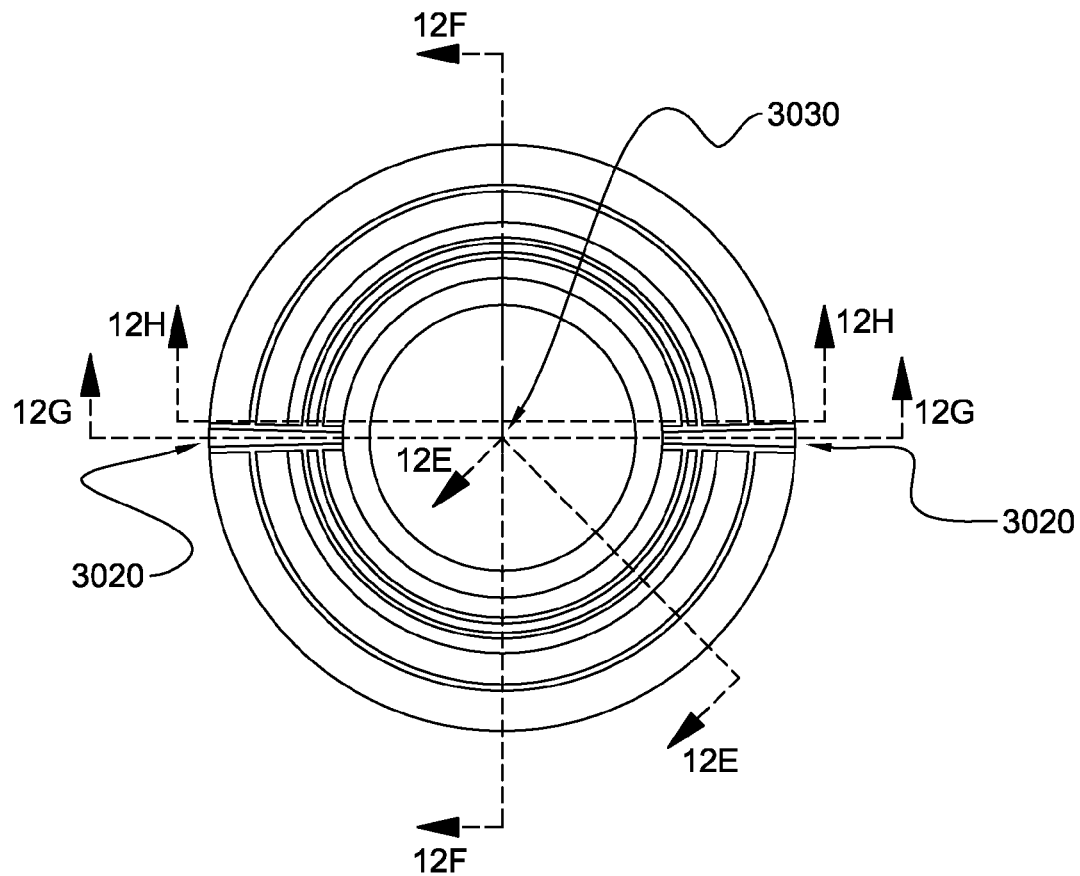
FIG. 12A-N show views of an embodiment of an elastomeric bearing assembly for use in a pinned connection such as shown in FIGS. 4 and 5 with the elastomeric bearing assembly including two frustospherical elastomeric portions concentrically disposed around the cylindrical elastomeric portion.
Figure 12E:
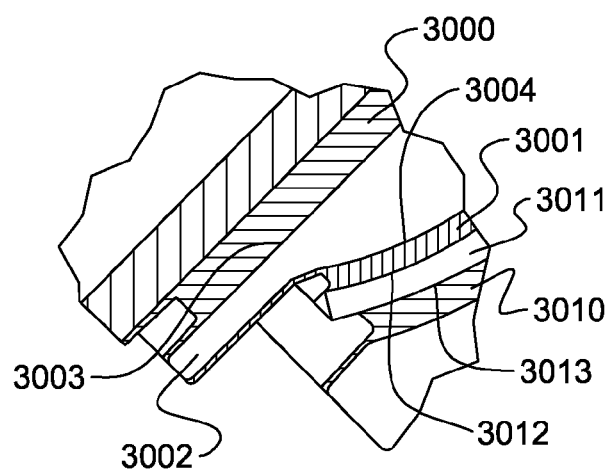
Figure 12F:
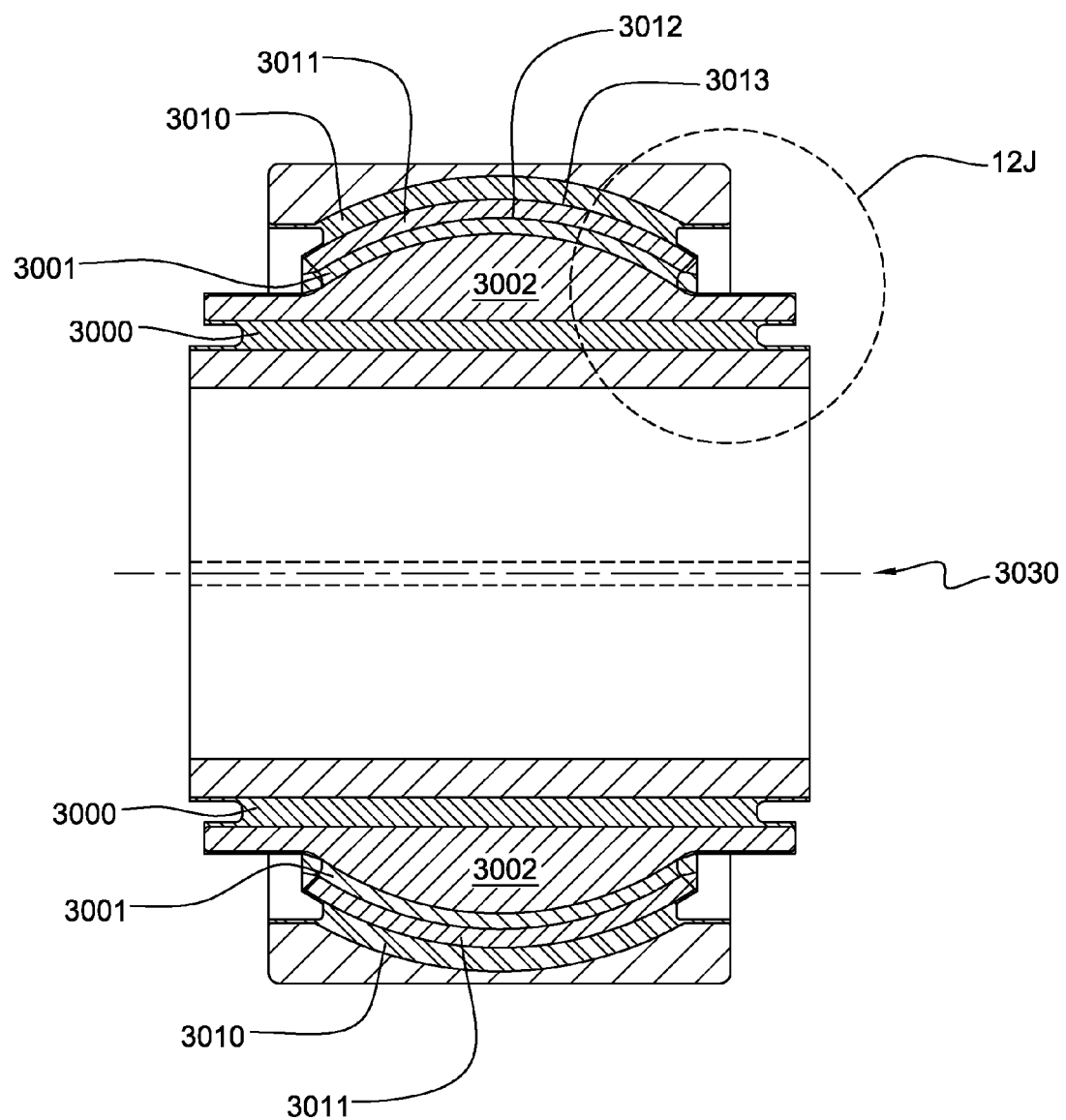
Figure 12G:
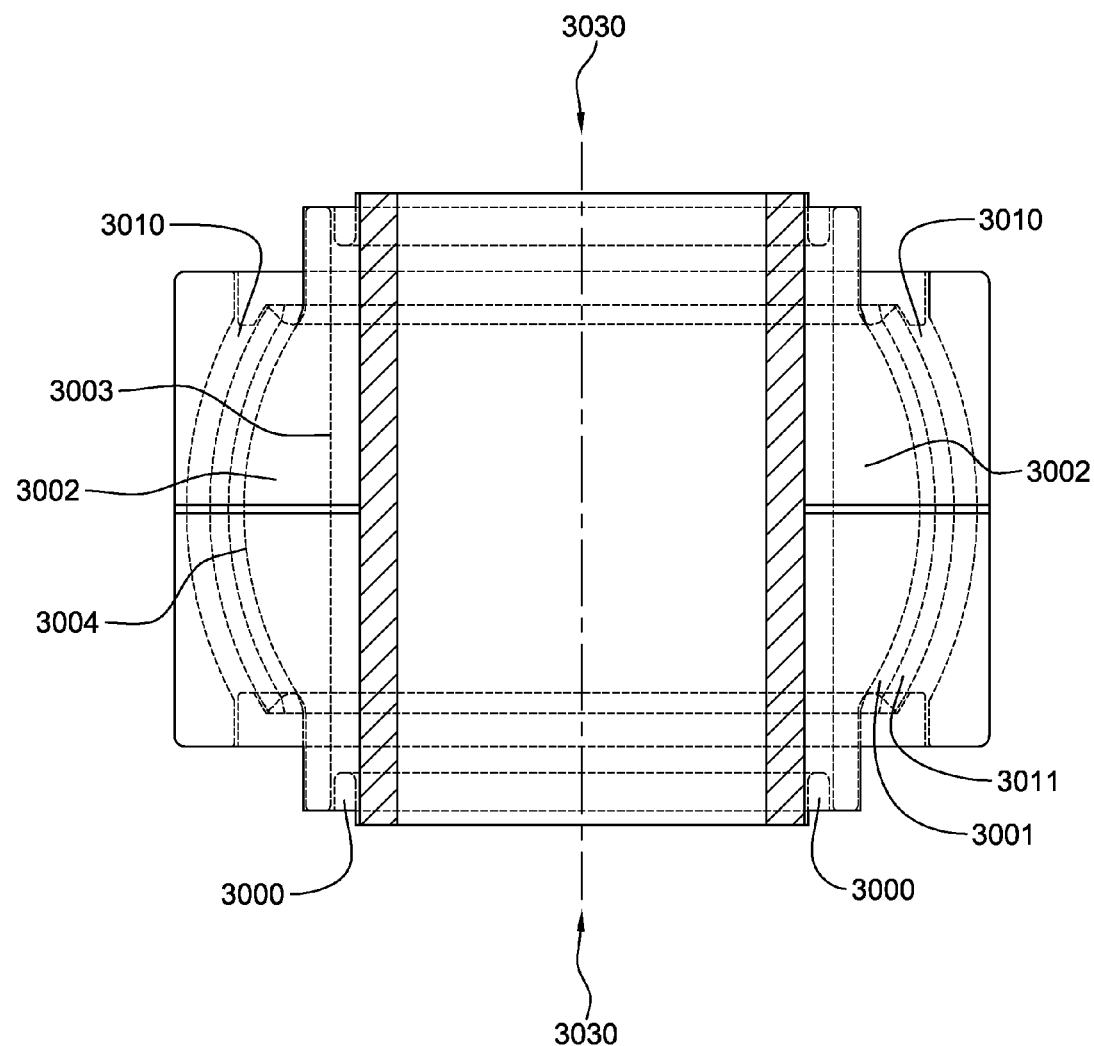
Figure 12H:
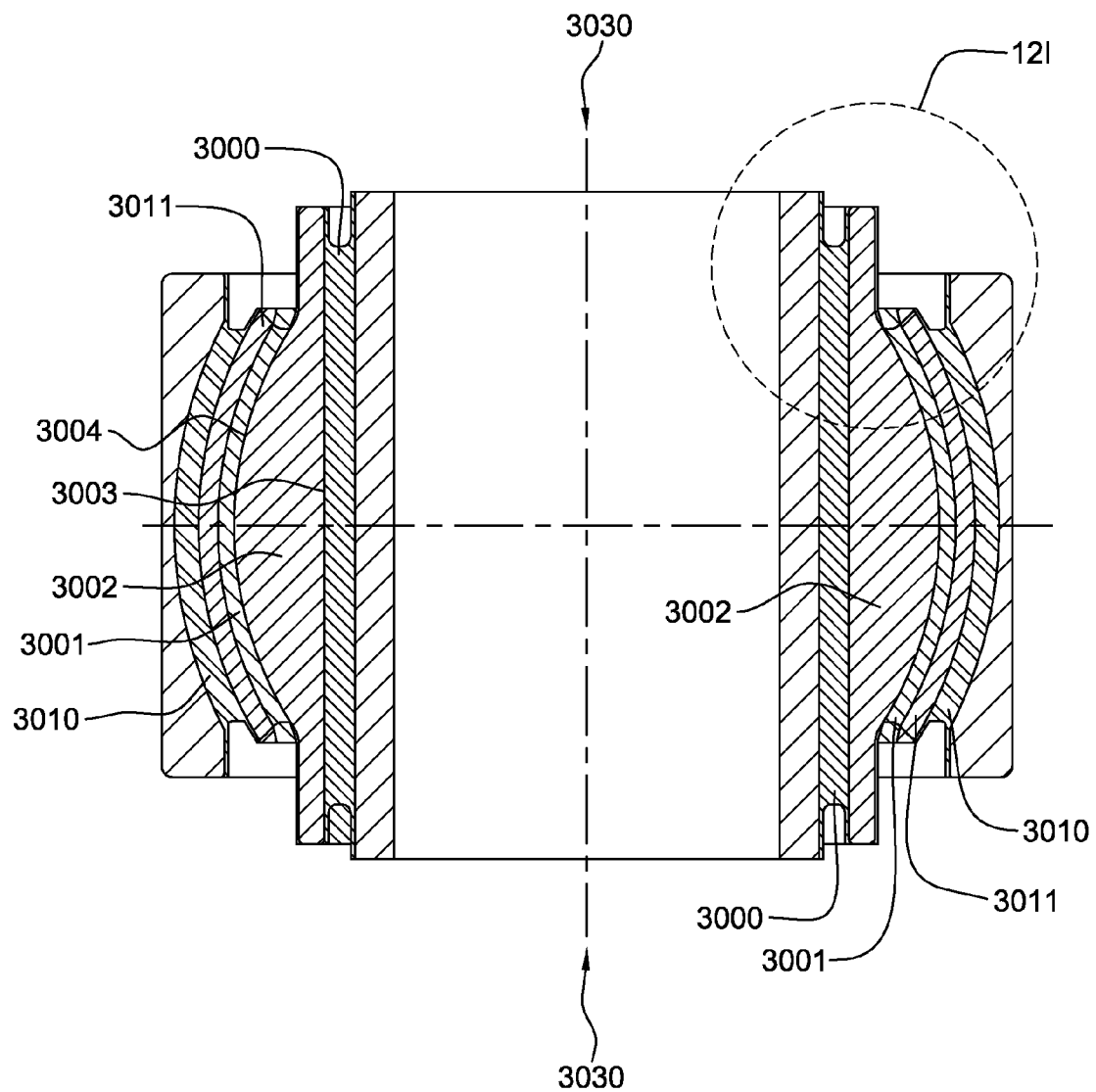
Figure 12J:
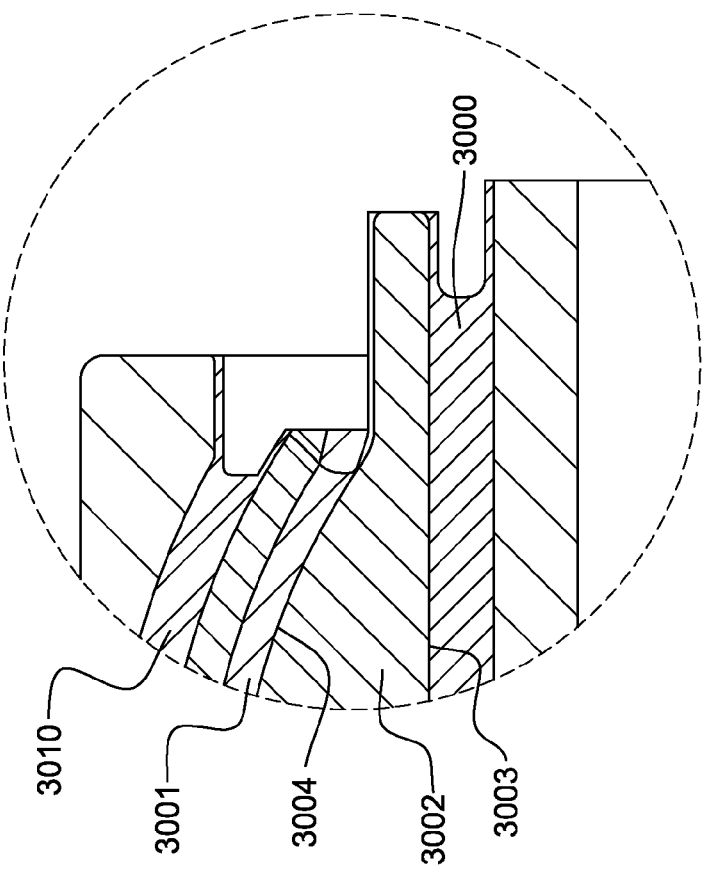
Figure 12I:
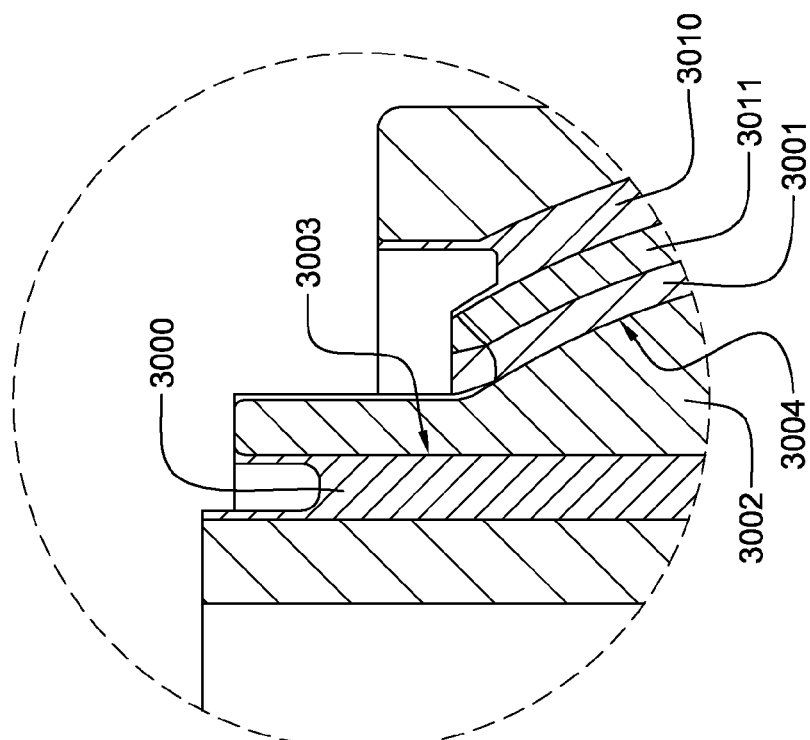
Figure 12K:
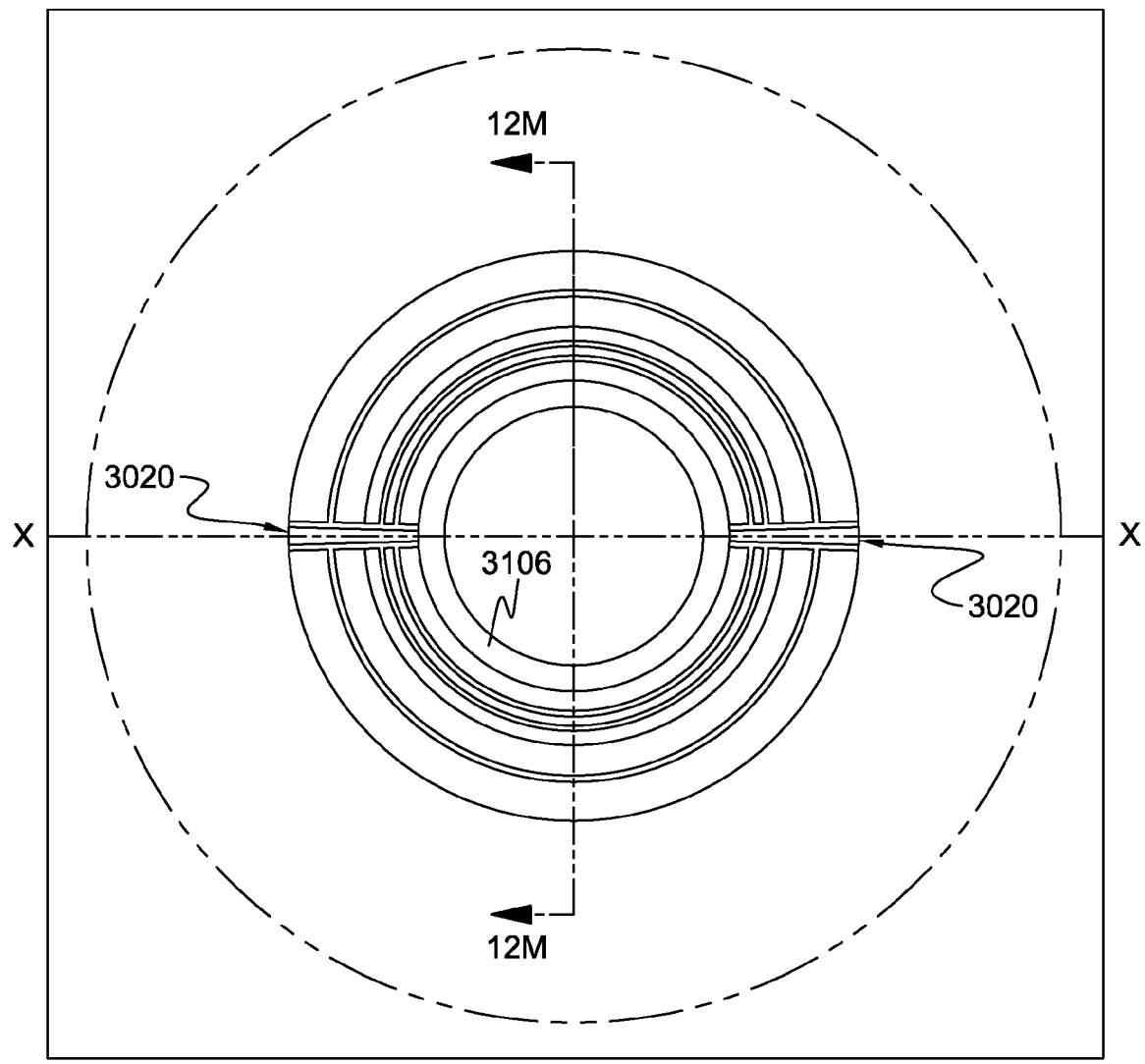
Figure 12L:
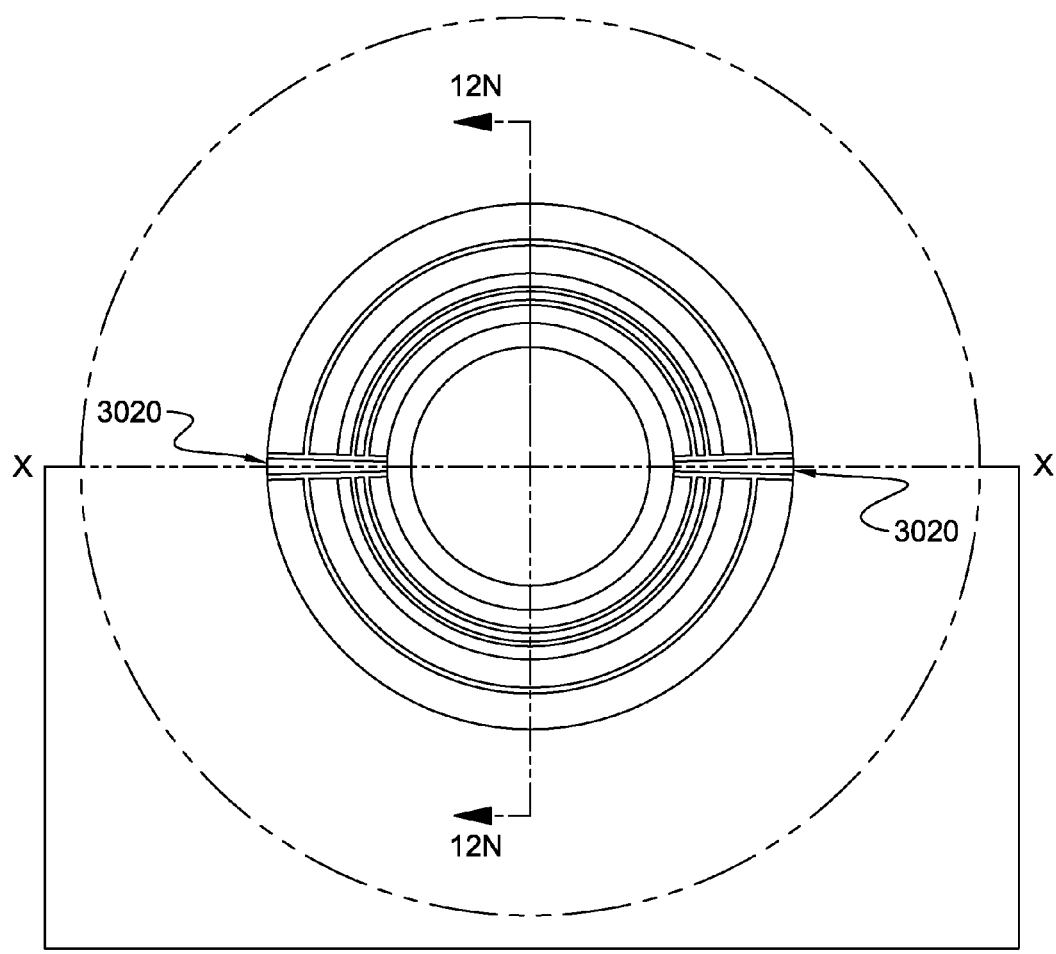
Figure 12M:
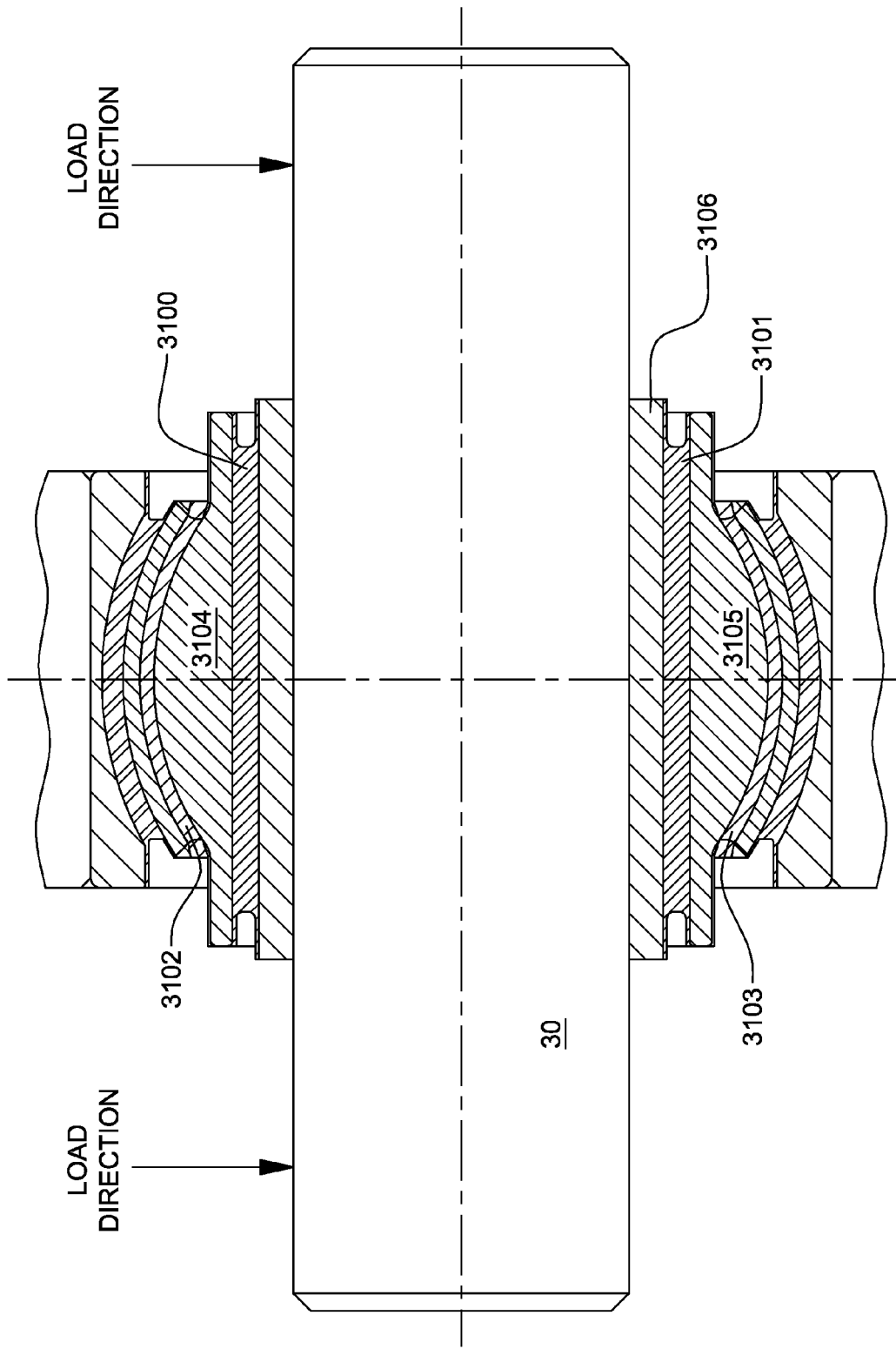
Figure 13A:
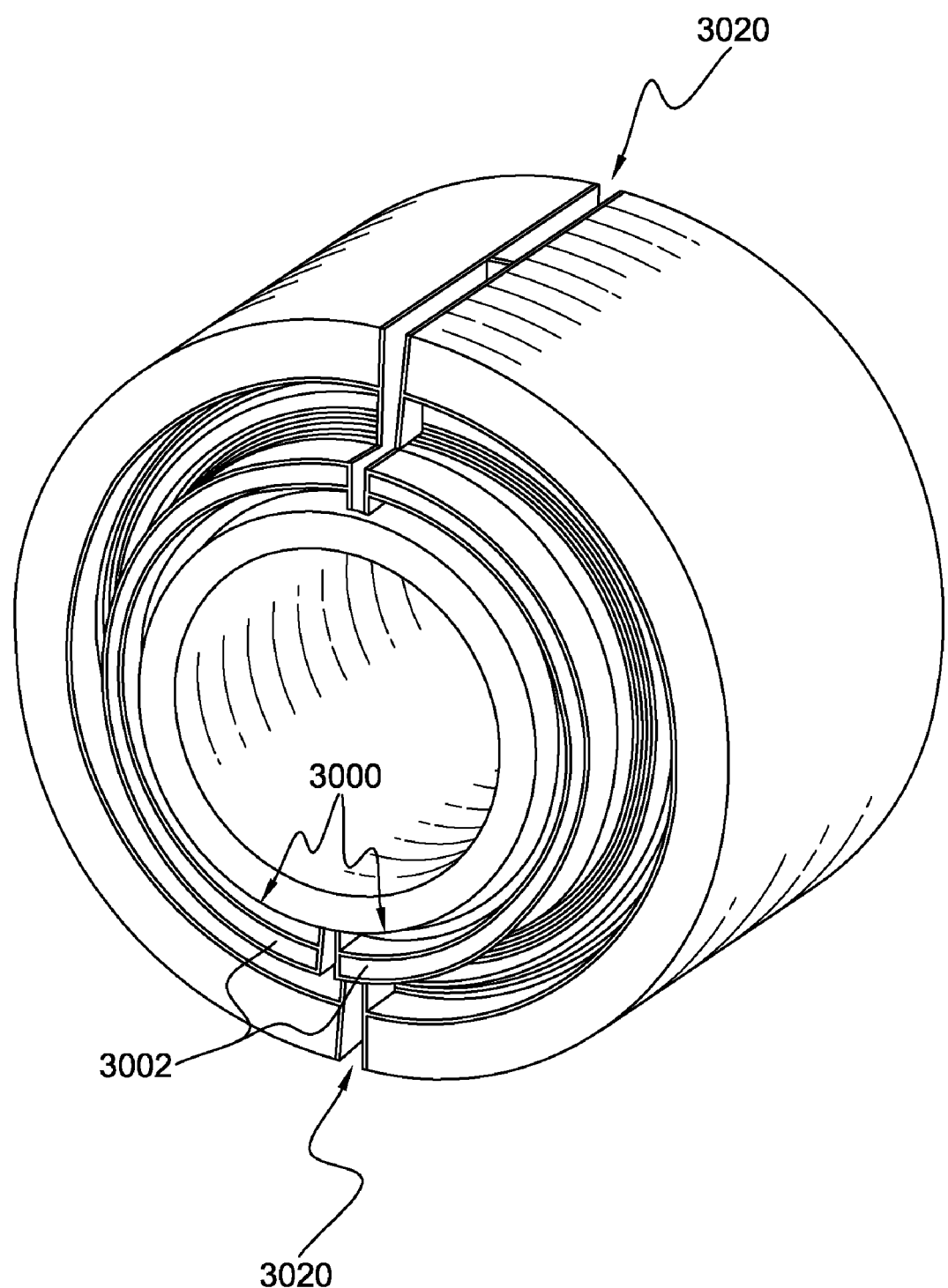
Figure 13B:
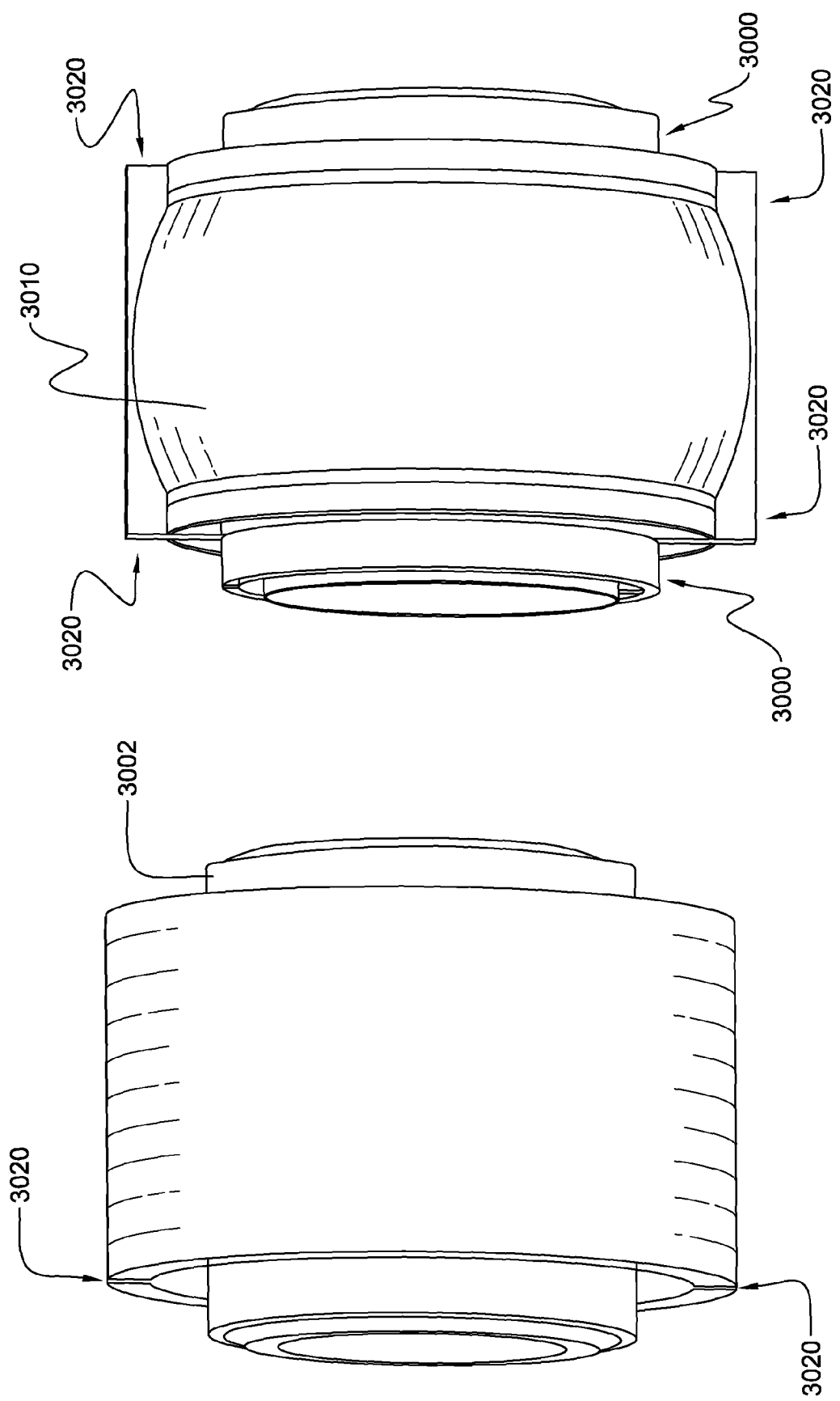
Figure 13D:
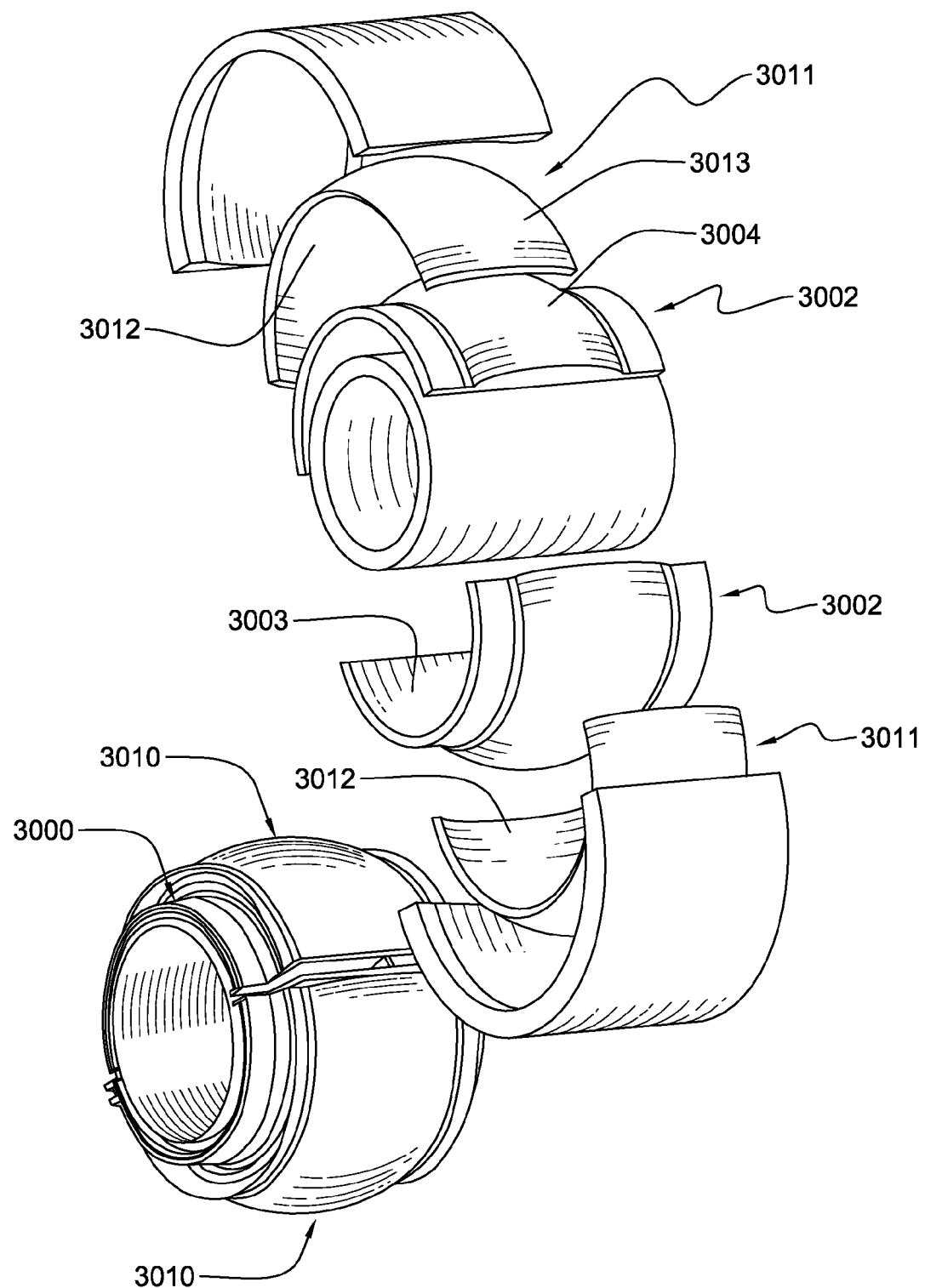
Figure 13E:
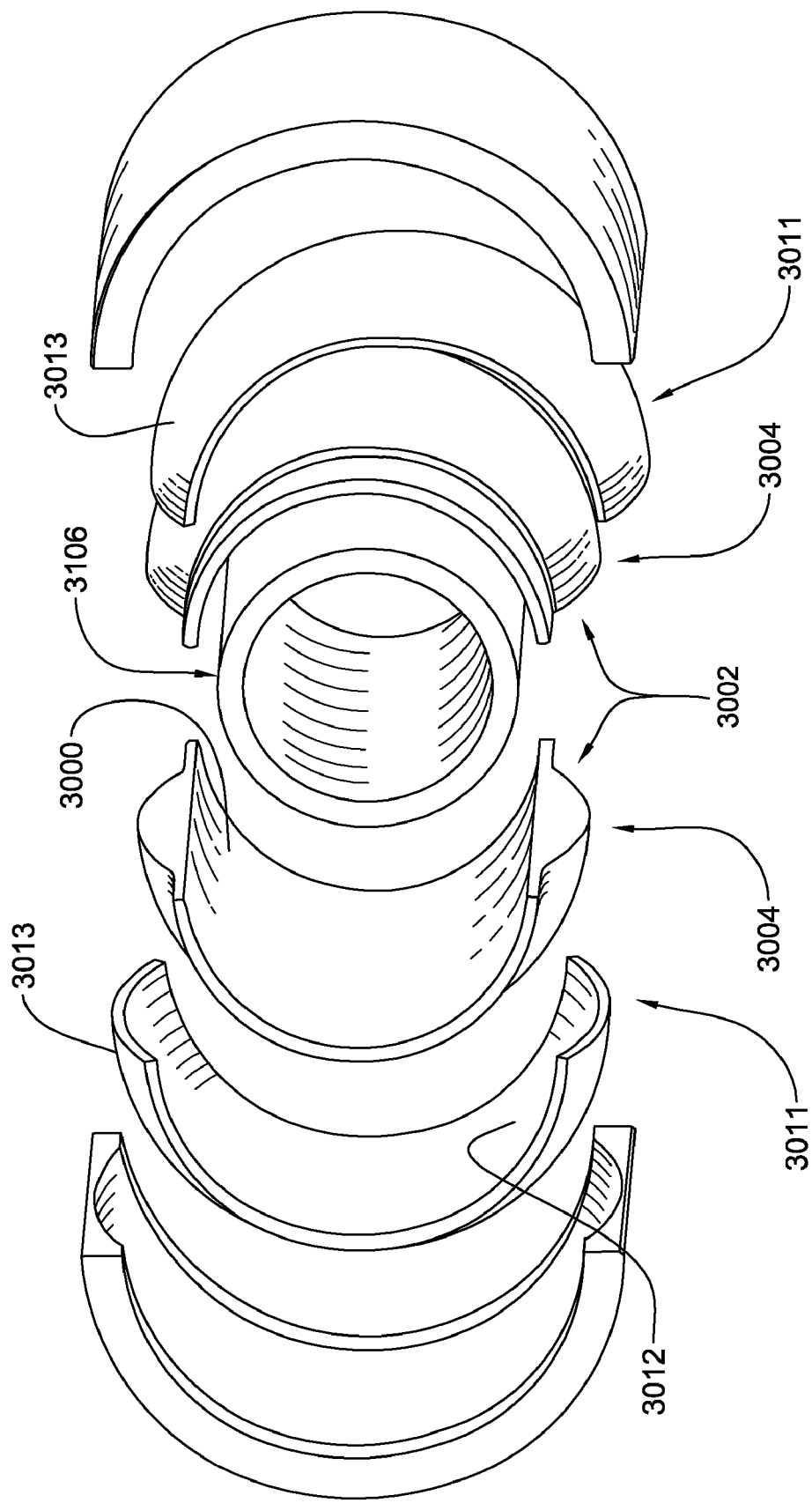
Figure 13F:
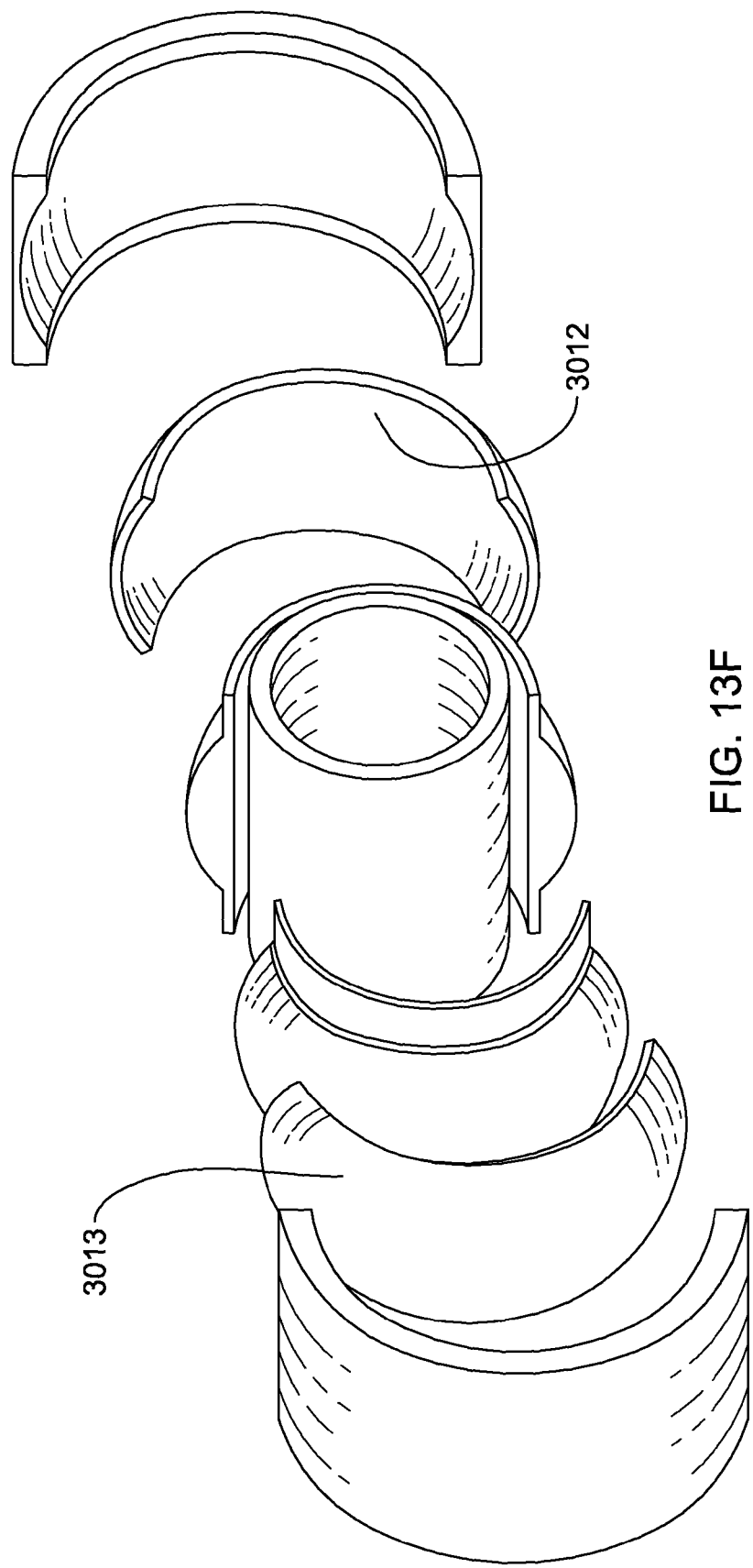

FIG. 11 shows an alternative embodiment of a dozer equalizer link elastomeric bearing 140 according to the invention. In this embodiment, an outer sleeve 1200 has a substantially cylindrical outer surface and a frustospherical inner surface 1221. A substantially cylindrical inner member 1204 is concentrically disposed within the outer sleeve 1200. A shim 1208 has a substantially cylindrical inner surface and a substantially frustospherical outer surface 1222, and is concentrically disposed between the outer sleeve 1200 and the inner member 1204. A substantially cylindrical first elastomeric layer is disposed between the inner member and the shim 1208. A substantially frustospherical second elastomeric layer 1206 is disposed between the outer sleeve 1200 and the shim 1208. As can be seen by comparing FIG. 11 to FIG. 8, the bearing 140 is similar to bearing 40, but its frustospherical elastomeric layer is an outer elastomeric layer, and its cylindrical elastomeric layer is an innermost elastomeric layer. In this alternative embodiment, the frustospherical elastomeric layer 1206 of bearing 140 durably reacts to applied cocking loads. In addition, in this alternative embodiment, the cylindrical elastomeric layer 1210 of bearing 140 durably reacts to torsional loads. Bearing 140 otherwise is substantially similar to bearing 40 described above.

A bearing 40, 140 according to the invention is capable of accommodating cocking displacement up to about 6 degrees or more. In other words, an elastomeric bearing 40, 140 according to the invention permits a pin 30 received in a central bore 225, 1225 of the bearing 40, 140 to rotate up to about 6 degrees or more about an axis that is transverse to the longitudinal axis of the pin 30 and bearing 40, 140. In addition, an elastomeric bearing 40, 140 according to the invention permits a pin 30 fixedly received in a central bore 225, 1225 of the bearing 40, 140 to rotate up to about 15 degrees or more about its longitudinal axis.

Preferably the elastomeric portions are elastomeric bodies, preferably molded elastomeric shell bodies, and most preferably molded elastomeric shell bodies having inner bonding surfaces and outer bonding surfaces. Preferably the molded elastomeric shell bodies are split elastomeric shell bodies split into upper and lower split elastomeric shell body halves.

Various embodiments of the present invention are described above. However, it will be appreciated that modifications and variations of the present invention also are within the scope of the invention. For example, though a dozer equalizer link bearing has been principally described as having two concentric elastomeric layers, a bearing according to the invention can include more than two elastomeric layers. In addition, a bearing according to the invention can include more than one substantially cylindrical elastomeric layer, and/or can include more than one substantially spherical or frustospherical elastomeric layer. Still further, though the elastomeric bearings principally have been described as being used to pivotally connect an end portion of an equalizer link to a roller track frame, such bearings also can be used to pivotally connect an equalizer link to a cab portion of a dozer or other tracked vehicle.

In an embodiment the invention includes a vehicle suspension system comprising an elastomeric bearing assembly. Preferably the elastomeric bearing assembly includes a substantially cylindrical elastomeric portion and a substantially frustospherical elastomeric portion. Preferably the elastomeric bearing assembly includes a nonelastomeric shim with a substantially cylindrical surface and a substantially frustospherical surface. FIGS. 12 and 13 show preferred elastomeric bearing assemblies. Preferably the elastomeric bearing assembly includes a substantially cylindrical elastomeric portion 3000 and a substantially frustospherical elastomeric portion 3001. Preferably the elastomeric bearing assembly includes a nonelastomeric shim 3002 with a substantially cylindrical surface 3003 and a substantially frustospherical surface 3004.

In an embodiment the invention includes a tracked vehicle suspension system comprising at least one elastomeric bearing. Preferably the elastomeric bearing includes at least one substantially cylindrical elastomeric portion 3000, at least one substantially frustospherical elastomeric portion 3001, and at least one substantially nonextensible shim 3002 disposed between and bonded to the substantially cylindrical elastomeric portion 3000 and the substantially frustospherical elastomeric portion 3001. In a preferred embodiment the substantially frustospherical elastomeric portion is substantially concentrically disposed within the substantially cylindrical elastomeric portion. In a preferred embodiment the substantially cylindrical elastomeric portion is substantially concentrically disposed within the substantially frustospherical elastomeric portion. Preferably the elastomeric bearing further comprises at least a second substantially frustospherical outer elastomeric portion 3010 and at least a second substantially nonextensible shim 3011 disposed between and bonded to the second substantially frustospherical outer elastomeric portion 3010 and the first substantially frustospherical elastomeric portion 3001.

Preferably the elastomeric bearing comprises at least a second substantially frustospherical elastomeric portion 3010 and at least a second substantially nonextensible nonelastomeric shim 3011 having a substantially frustospherical shim elastomer inner bonding surface 3012 and a substantially frustospherical shim elastomer outer bonding surface 3013. Preferably the substantially cylindrical elastomeric portion, the substantially frustospherical elastomeric portion; and the shim each include at least one longitudinal split 3020 extending through at least a portion thereof.

In an embodiment the invention includes a tracked vehicle. Preferably the tracked vehicle includes a first moving track roller frame assembly; a second moving track roller frame assembly; an equalizer link coupled to the first and second moving track roller frame assembly, the link comprising a first end portion and a second end portion. Preferably the tracked vehicle includes a first elastomeric bearing at least partially coupling the first end portion to the first moving track roller frame assembly. Preferably the first elastomeric bearing assembly includes at least one substantially cylindrical elastomeric portion, at least one first substantially frustospherical elastomeric portion, and at least one substantially nonextensible shim disposed between and bonded to the substantially cylindrical elastomeric portion and the substantially frustospherical elastomeric portion. In an embodiment the substantially frustospherical elastomeric portion is substantially concentrically disposed within the substantially cylindrical elastomeric portion. In an embodiment preferably the substantially cylindrical elastomeric portion is substantially concentrically disposed within the first substantially frustospherical elastomeric portion. Preferably the elastomeric bearing includes at least a second substantially frustospherical outer elastomeric portion 3010 and at least a second substantially frustospherical outer nonextensible bonded shim 3011, the second substantially frustospherical outer nonextensible bonded shim and the second substantially frustospherical outer elastomeric portion substantially concentrically disposed around the outside of the first substantially frustospherical elastomeric portion 3001 with the substantially cylindrical elastomeric portion 3000 substantially concentrically disposed within. Preferably the elastomeric bearing substantially cylindrical elastomeric portion 3000 is an elongated outwardly extending substantially cylindrical elastomeric portion, with the elongated outwardly extending substantially cylindrical elastomeric portion extending axially along a bore axis 3030 out below the first substantially frustospherical elastomeric portion 3001 and the second substantially frustospherical outer elastomeric portion 3010.

Preferably the substantially cylindrical elastomeric portion, the substantially frustospherical elastomeric portion, and the shims all include a first and second opposing longitudinal splits extending through portions thereof, with the substantially cylindrical elastomeric portion comprised of an upper split half cylindrical elastomeric portion and a lower split half cylindrical elastomeric portion, with the substantially frustospherical elastomeric portion comprised of an upper split half frustospherical elastomeric portion and a lower split half frustospherical elastomeric portion, and with the shim comprised of an upper split shim half and a lower split shim half with a load direction directed downward through the lower split shim half. Preferably the substantially cylindrical elastomeric portion 3000, the substantially frustospherical elastomeric portion 3001, and the shims 3002 all include a first and second opposing longitudinal splits 3020 extending through portions thereof, with the substantially cylindrical elastomeric portion comprised of an upper split half cylindrical elastomeric portion 3100 and a lower split half cylindrical elastomeric portion 3101, with the substantially frustospherical elastomeric portion comprised of an upper split half frustospherical elastomeric portion 3102 and a lower split half frustospherical elastomeric portion 3103, and with the shim comprised of an upper split shim half 3104 and a lower split shim half 3105 with a load direction directed downward through the lower split shim half 3105. Preferably the elastomeric bearing assembly of the tracked vehicle couples the link end and the moving track roller frame assembly with a downward load direction applied from a received pin 30 downward through a nonsplit nonelastomeric inner member 3106, through a lower split half cylindrical elastomeric portion 3101, through a lower split shim half 3105, and through a lower split half frustospherical elastomeric portion 3103. Preferably the downward load direction is further applied down through a second outer lower split frustospherical nonelastomeric shim half 3110, through a second outer lower split half frustospherical elastomeric portion 3111, and through a lower split nonelastomeric outer member half 3112.

Preferably the tracked vehicle includes a second elastomeric bearing at least partially coupling the second end portion to the second moving track roller frame assembly, the second elastomeric bearing the second elastomeric bearing comprising at least one substantially cylindrical inner elastomeric portion 3000; at least one first substantially frustospherical elastomeric portion 3001; at least one substantially nonextensible shim 3002 disposed between and bonded to the substantially cylindrical elastomeric portion and the substantially frustospherical elastomeric portion; and at least a second substantially frustospherical outer elastomeric portion 3010 and at least a second substantially frustospherical outer nonextensible bonded shim 3011, the second substantially frustospherical outer nonextensible bonded shim 3011 and the second substantially frustospherical outer elastomeric portion 3010 substantially concentrically disposed around the outside of the first substantially frustospherical elastomeric portion 3001 with the substantially cylindrical elastomeric portion 3000 substantially concentrically disposed within the first substantially frustospherical elastomeric portion 3001, wherein the substantially cylindrical elastomeric portion 3000 is an elongated outwardly extending substantially cylindrical elastomeric portion, with the elongated outwardly extending substantially cylindrical elastomeric portion extending axially along a bore axis 3030 out below the first substantially frustospherical elastomeric portion and the second substantially frustospherical outer elastomeric portion.

Preferably the tracked vehicle substantially cylindrical elastomeric portion comprises a torsional load carrying elastomer, and the substantially frustospherical elastomeric portion comprises a cocking load carrying elastomer with the elastomeric bearing providing a cocking displacement of at least 2 degrees and a rotation of at least 6 degrees. Preferably the tracked vehicle elastomeric bearing has a vehicle operation durability life of at least 1000 hours with the bearing carrying a plurality of torsional and cocking loads during the vehicle operation durability life. Preferably the elastomeric bearing includes at least a second substantially frustospherical outer elastomeric portion 3010 and at least a second substantially frustospherical outer nonextensible bonded shim 3011, the second substantially frustospherical outer nonextensible bonded shim 3011 and the second substantially frustospherical outer elastomeric portion 3010 substantially concentrically disposed around the outside of the first substantially frustospherical elastomeric portion 3001 with the substantially cylindrical elastomeric portion 3000 substantially concentrically disposed within the first substantially frustospherical elastomeric portion 3001. Preferably the second substantially frustospherical outer elastomeric portion 3010 has a balanced second substantially frustospherical outer elastomeric portion outside diameter, inside diameter, thickness, and length providing a second substantially frustospherical outer elastomeric portion elastomer fatigue life. Preferably the first substantially frustospherical elastomeric portion 3001 has a balanced first substantially frustospherical outer elastomeric portion outside diameter, inside diameter, thickness, and length providing a first substantially frustospherical outer elastomeric portion elastomer fatigue life. Preferably the substantially cylindrical elastomeric portion 3000 has a balanced substantially cylindrical elastomeric portion outside diameter, inside diameter, thickness, and length, providing a substantially cylindrical elastomeric portion elastomer fatigue life wherein the second substantially frustospherical outer elastomeric portion elastomer fatigue life is proximate the first substantially frustospherical outer elastomeric portion elastomer fatigue life which is proximate the substantially cylindrical elastomeric portion elastomer fatigue life. Preferably the first substantially frustospherical elastomeric portion has a balanced first substantially frustospherical elastomeric portion outside diameter, inside diameter, thickness, and length providing a first substantially frustospherical outer elastomeric portion elastomer fatigue life and the substantially cylindrical elastomeric portion has a balanced substantially cylindrical elastomeric portion outside diameter, inside diameter, thickness, and length, providing a substantially cylindrical elastomeric portion elastomer fatigue life wherein the first substantially frustospherical outer elastomeric portion elastomer fatigue life is proximate the substantially cylindrical elastomeric portion elastomer fatigue life. In an embodiment the first substantially frustospherical elastomeric portion is substantially concentrically disposed within the substantially cylindrical elastomeric portion. In an embodiment the substantially cylindrical elastomeric portion is substantially concentrically disposed within the first substantially frustospherical elastomeric portion.

In an embodiment the invention includes an elastomeric bearing assembly for a vehicle suspension system. Preferably the elastomeric bearing assembly includes at least one substantially cylindrical elastomeric portion; at least a first substantially frustospherical elastomeric portion; and at least a first substantially nonextensible elastomeric shim disposed between and bonded to the substantially cylindrical elastomeric portion and the substantially frustospherical elastomeric portion. Preferably the substantially cylindrical elastomeric portion, the first substantially frustospherical elastomeric portion, and the first substantially nonextensible elastomeric shim are concentrically centered around a center bore axis 3030. Preferably the first substantially nonextensible nonelastomeric shim has a first end portion and a distal second end portion. Preferably the substantially frustospherical elastomeric portion has a spherical shape terminating at a first end portion and a distal second end portion. Preferably the substantially cylindrical elastomeric portion has a first end portion and a distal second end portion, the substantially cylindrical elastomeric first end portion elongated outwardly extending axially along the bore axis out beyond the substantially frustospherical elastomeric first end portion, and the substantially cylindrical elastomeric second end portion elongated outwardly extending axially along the bore axis out beyond the substantially frustospherical elastomeric second end portion. In an embodiment the substantially frustospherical elastomeric first end portion and distal second end portion are substantially thicker than at least one other thinner portion of the substantially frustospherical elastomeric portion. In an embodiment the substantially cylindrical elastomeric first end portion and distal second end portion are substantially thicker than at least one other thinner portion of the substantially cylindrical elastomeric portion. In an embodiment the elastomeric bearing assembly includes a second outer substantially frustospherical elastomeric portion having a second outer spherical shape terminating at a second outer substantially frustospherical elastomeric first end portion and a second outer substantially frustospherical elastomeric distal second end portion, wherein the substantially cylindrical elastomeric first end portion elongated outwardly extending axially along the bore axis 3030 out beyond second outer substantially frustospherical elastomeric first end portion and the substantially cylindrical elastomeric second end portion elongated outwardly extending axially along the bore axis 3030 out beyond second outer substantially frustospherical elastomeric distal second end portion. In an embodiment the elastomeric bearing assembly includes at least one nonextensible nonelastomeric member with a first diameter proximate to a thinner portion and a second diameter proximate to a thicker end portion, and wherein the first diameter is larger than the second diameter.

In an embodiment the invention includes a method of making a vehicle suspension system elastomeric bearing assembly. The method of making a vehicle suspension system elastomeric bearing assembly includes providing a substantially cylindrical shaped elastomeric layer disposed between a first nonextensible nonelastomeric member surface and a second nonextensible nonelastomeric member surface, with the first and second nonextensible nonelastomeric member surfaces configured such that the substantially cylindrical elastomeric layer therebetween includes an end portion that is substantially thicker than at least one other thinner portion of the substantially cylindrical elastomeric layer. The method includes providing a substantially frustospherical shaped elastomeric layer disposed between a third nonextensible nonelastomeric member surface and a fourth nonextensible nonelastomeric member surface, the fourth and third nonextensible nonelastomeric members are configured such that the substantially frustospherical elastomeric layer therebetween includes an end portion that is substantially thicker than at least one other thinner portion of the substantially frustospherical elastomeric layer.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

What is claimed is:

1. A vehicle suspension system comprising an elastomeric bearing assembly, the elastomeric bearing assembly comprising:
   a substantially cylindrical outer member;
   a substantially cylindrical elastomeric portion coupled to said cylindrical outer member;
   a shim coupled to said substantially cylindrical elastomeric portion;
   a substantially frustospherical elastomeric section coupled to said shim; and
   an inner member coupled to said frustospherical elastomeric portion
   wherein said substantially cylindrical outer member, said substantially cylindrical elastomeric portion, said shim, and said substantially frustospherical elastomeric section include a first and a second opposing longitudinal extending split with said substantially cylindrical outer member comprised of an upper split half cylindrical outer member half and a lower split half cylindrical outer member half, said substantially cylindrical elastomeric portion comprised of an upper split half cylindrical elastomeric portion and a lower split half cylindrical elastomeric portion, with said substantially frustospherical elastomeric section comprised of an upper split half frustospherical elastomeric portion and a lower split half frustospherical elastomeric portion, and with said shim comprised of an upper split shim half and a lower split shim half with a load direction directed downward through said lower split half cylindrical outer member half, said lower split half cylindrical elastomeric portion, said lower split half frustospherical elastomeric portion, and said lower split shim half.

2. The vehicle suspension system of claim 1, wherein said shim comprises a substantially cylindrical outer surface and a substantially frustospherical inner surface.

3. The vehicle suspension system of claim 2, wherein said shim comprises a middle portion, a first end, and a second end, and wherein the first and second ends have diameters that are smaller than a diameter of the middle portion.

4. A tracked vehicle suspension system comprising:
at least one elastomeric bearing comprising:
at least one substantially cylindrical elastomeric portion;
at least one substantially frustospherical elastomeric portion; and
at least one substantially non-extensible shim disposed between and bonded to the substantially cylindrical elastomeric portion and the substantially frustospherical elastomeric portion
wherein, said substantially cylindrical elastomeric portion, said substantially non-extensible shim, and said substantially frustospherical elastomeric portion include a first longitudinal extending split and an opposing second longitudinal extending split with said substantially cylindrical elastomeric portion comprised of an upper split half cylindrical elastomeric portion and a lower split half cylindrical elastomeric portion, with said substantially frustospherical elastomeric portion comprised of an upper split half frustospherical elastomeric portion and a lower split half frustospherical elastomeric portion, and with said substantially non-extensible shim comprised of an upper split shim half and a lower split shim half with a load direction directed downward through said lower split half cylindrical elastomeric portion, said lower split half frustospherical elastomeric portion, and said lower split shim half.

5. A tracked vehicle suspension system according to claim 4, wherein the substantially frustospherical elastomeric portion is substantially concentrically disposed within the substantially cylindrical elastomeric portion.

6. A tracked vehicle suspension system according to claim 4, wherein the substantially cylindrical elastomeric portion is substantially concentrically disposed within the substantially frustospherical elastomeric portion.

7. A tracked vehicle suspension system according to claim 6, wherein the elastomeric bearing further comprises at least a second substantially frustospherical outer elastomeric portion and at least a second substantially nonextensible shim disposed between and bonded to the second substantially frustospherical outer elastomeric portion and the one substantially frustospherical elastomeric portion with said second substantially frustospherical outer elastomeric portion comprised of an upper split half second frustospherical outer elastomeric portion and a lower split half second frustospherical outer elastomeric portion, and with said second substantially nonextensible shim comprised of an upper split second substantially nonextensible shim half and a lower split second substantially nonextensible shim half.

8. A tracked vehicle suspension system according to claim 4, wherein the elastomeric bearing further comprises at least a second substantially frustospherical elastomeric portion and at least a second substantially nonextensible nonelastomeric shim having a substantially frustospherical shim elastomer inner bonding surface and a substantially frustospherical shim elastomer outer bonding surface with said second substantially frustospherical elastomeric portion comprised of an upper split half second frustospherical elastomeric portion and a lower split half second frustospherical elastomeric portion, and with said second substantially nonextensible nonelastomeric shim comprised of an upper split second substantially nonextensible shim half and a lower split second substantially nonextensible shim half.

9. A tracked vehicle comprising:
a first moving track roller frame assembly;
a second moving track roller frame assembly;
an equalizer link coupled to said first and second moving track roller frame assembly, said link comprising a first end portion and a second end portion;
a first elastomeric bearing at least partially coupling said first end portion to said first moving track roller frame assembly, said first elastomeric bearing assembly comprising:
at least one substantially cylindrical elastomeric portion;
at least one first substantially frustospherical elastomeric portion; and
at least one substantially non-extensible shim disposed between and bonded to the substantially cylindrical elastomeric portion and the substantially frustospherical elastomeric portion wherein the substantially cylindrical elastomeric portion, the substantially frustospherical elastomeric portion, and the non-extensible shim each include a first longitudinal extending split and a second longitudinal extending split with the substantially cylindrical elastomeric portion comprised of an upper split half cylindrical elastomeric portion and a lower split half cylindrical elastomeric portion, with the substantially frustospherical elastomeric portion comprised of an upper split half frustospherical elastomeric portion and a lower split half frustospherical elastomeric portion, and with the non-extensible shim comprised of an upper split shim half and a lower split shim half with a load direction directed downward through said lower split half cylindrical elastomeric portion, said lower split half frustospherical elastomeric portion, and said lower split shim half.

10. A tracked vehicle according to claim 9, wherein the substantially frustospherical elastomeric portion is substantially concentrically disposed within the substantially cylindrical elastomeric portion.

11. A tracked vehicle according to claim 9 wherein the substantially cylindrical elastomeric portion is substantially concentrically disposed within the first substantially frustospherical elastomeric portion.

12. A tracked vehicle according to claim 11, wherein the elastomeric bearing includes at least a second substantially frustospherical outer elastomeric portion and at least a second substantially frustospherical outer nonextensible bonded shim, said second substantially frustospherical outer nonextensible bonded shim and said second substantially frustospherical outer elastomeric portion substantially concentrically disposed around the outside of the first substantially frustospherical elastomeric portion with the substantially cylindrical elastomeric portion substantially concentrically disposed within with said second substantially frustospherical outer elastomeric portion comprised of an upper split second substantially frustospherical outer elastomeric portion half and a lower split second substantially frustospherical outer elastomeric portion half and with said second substantially frustospherical outer nonextensible bonded shim comprised of an upper split second substantially frustospherical outer nonextensible bonded shim half and a lower split second substantially frustospherical outer nonextensible bonded shim half.

13. A tracked vehicle according to claim 12, wherein the elastomeric bearing substantially cylindrical elastomeric portion is an elongated outwardly extending substantially cylindrical elastomeric portion, with the elongated outwardly extending substantially cylindrical elastomeric portion extending axially along a bore axis out below said first substantially frustospherical elastomeric portion and said second substantially frustospherical outer elastomeric portion.

14. A tracked vehicle according to claim 9 and further comprising a second elastomeric bearing at least partially coupling the second end portion to said second moving track roller frame assembly, said second elastomeric bearing said second elastomeric bearing comprising:
    at least one substantially cylindrical inner elastomeric portion;
    at least one first substantially frustospherical elastomeric portion;
    at least one substantially nonextensible shim disposed between and bonded to the substantially cylindrical elastomeric portion and the substantially frustospherical elastomeric portion;
    at least a second substantially frustospherical outer elastomeric portion and at least a second substantially frustospherical outer nonextensible bonded shim, said second substantially frustospherical outer nonextensible bonded shim and said second substantially frustospherical outer elastomeric portion substantially concentrically disposed around the outside of the first substantially frustospherical elastomeric portion with the substantially cylindrical elastomeric portion substantially concentrically disposed within said first substantially frustospherical elastomeric portion, wherein the substantially cylindrical elastomeric portion is an elongated outwardly extending substantially cylindrical elastomeric portion, with the elongated outwardly extending substantially cylindrical elastomeric portion extending axially along a bore axis out below said first substantially frustospherical elastomeric portion and said second substantially frustospherical outer elastomeric portion wherein the second elastomeric bearing substantially cylindrical elastomeric portion, the second elastomeric bearing substantially frustospherical elastomeric portion, and the second elastomeric bearing nonextensible shim each include a first longitudinal extending split and a second longitudinal extending split with the substantially cylindrical elastomeric portion comprised of an upper split half cylindrical elastomeric portion and a lower split half cylindrical elastomeric portion, with the substantially frustospherical elastomeric portion comprised of an upper split half frustospherical elastomeric portion and a lower split half frustospherical elastomeric portion, and with the non-extensible shim comprised of an upper split shim half and a lower split shim half with a second elastomeric bearing load direction directed downward through said lower split half cylindrical elastomeric portion, said lower split half frustospherical elastomeric portion, and said lower split shim half.

15. A tracked vehicle according to claim 9, wherein the substantially cylindrical elastomeric portion comprises a torsional load carrying elastomer, and the substantially frustospherical elastomeric portion comprises a cocking load carrying elastomer, and wherein the first elastomeric bearing provides a cocking displacement of at least 2 degrees and a rotation of at least 6 degrees.

16. A tracked vehicle according to claim 9, wherein said first elastomeric bearing has a vehicle operation durability life of at least 1000 hours with said bearing carrying a plurality of torsional and cocking loads during said vehicle operation durability life.

17. A tracked vehicle according to claim 16, wherein said first elastomeric bearing includes at least a second substantially frustospherical outer elastomeric portion and at least a second substantially frustospherical outer nonextensible bonded shim, said second substantially frustospherical outer nonextensible bonded shim and said second substantially frustospherical outer elastomeric portion substantially concentrically disposed around the outside of the first substantially frustospherical elastomeric portion with the substantially cylindrical elastomeric portion substantially concentrically disposed within said first substantially frustospherical elastomeric portion with said second substantially frustospherical outer elastomeric portion comprised of an upper split second substantially frustospherical outer elastomeric portion half and a lower split second substantially frustospherical outer elastomeric portion half and with said second substantially frustospherical outer nonextensible bonded shim comprised of an upper split second substantially frustospherical outer nonextensible bonded shim half and a lower split second substantially frustospherical outer nonextensible bonded shim half.

18. A tracked vehicle according to claim 17,
    said second substantially frustospherical outer elastomeric portion having a balanced second substantially frustospherical outer elastomeric portion outside diameter, inside diameter, thickness, and length providing a second substantially frustospherical outer elastomeric portion elastomer fatigue life;
    said first substantially frustospherical outer elastomeric portion having a balanced first substantially frustospherical outer elastomeric portion outside diameter, inside diameter, thickness, and length providing a first substantially frustospherical outer elastomeric portion elastomer fatigue life;
    said substantially cylindrical elastomeric portion having a balanced substantially cylindrical elastomeric portion outside diameter, inside diameter, thickness, and length, providing a substantially cylindrical elastomeric portion elastomer fatigue life wherein said second substantially frustospherical outer elastomeric portion elastomer fatigue life proximates said first substantially frustospherical outer elastomeric portion elastomer fatigue life which proximates said substantially cylindrical elastomeric portion elastomer fatigue life.

19. An elastomeric bearing assembly for a vehicle suspension system, the elastomeric bearing assembly comprising:
    a substantially cylindrical outer member;
    at least one substantially cylindrical elastomeric portion;
    at least a first substantially frustospherical elastomeric portion;
    at least a first substantially nonextensible nonelastomeric shim disposed between and bonded to the substantially cylindrical elastomeric portion and the substantially frustospherical elastomeric portion;

said substantially cylindrical elastomeric portion, said first substantially frustospherical elastomeric portion, and said first substantially nonextensible nonelastomeric shim concentrically centered around a center bore axis, said first substantially nonextensible nonelastomeric shim having a first end portion and a distal second end portion, said substantially frustospherical elastomeric portion having a spherical shape terminating at a first end portion and a distal second end portion, said substantially cylindrical elastomeric portion having a first end portion and a distal second end portion, said substantially cylindrical elastomeric first end portion elongated outwardly extending axially along said bore axis out beyond said substantially frustospherical elastomeric first end portion, and said substantially cylindrical elastomeric second end portion elongated outwardly extending axially along said bore axis out beyond said substantially frustospherical elastomeric second end portion wherein said substantially cylindrical outer member, said substantially cylindrical elastomeric portion, said first substantially nonextensible nonelastomeric shim, and said substantially frustospherical elastomeric portion include a first and a second opposing longitudinal extending split aligned with said center bore axis with said substantially cylindrical outer member comprised of an upper split half cylindrical outer member half and a lower split half cylindrical outer member half, said substantially cylindrical elastomeric portion comprised of an upper split half cylindrical elastomeric portion and a lower split half cylindrical elastomeric portion, with said substantially frustospherical elastomeric portion comprised of an upper split half frustospherical elastomeric portion and a lower split half frustospherical elastomeric portion, and with said shim comprised of an upper split shim half and a lower split shim half with a load direction directed downward through said lower split half cylindrical outer member half, said lower split half cylindrical elastomeric portion, said lower split half frustospherical elastomeric portion, and said lower split shim half.

20. An elastomeric bearing assembly according to claim 19, said substantially frustospherical elastomeric first end portion and distal second end portion are substantially thicker than at least one other thinner portion of said substantially frustospherical elastomeric portion, said substantially cylindrical elastomeric first end portion and distal second end portion are substantially thicker than at least one other thinner portion of said substantially cylindrical elastomeric portion.

21. An elastomeric bearing assembly according to claim 19, including a second outer substantially frustospherical elastomeric portion having a second outer spherical shape terminating at a second outer substantially frustospherical elastomeric first end portion and a second outer substantially frustospherical elastomeric distal second end portion, wherein said substantially cylindrical elastomeric first end portion elongated outwardly extending axially along said bore axis out beyond second outer substantially frustospherical elastomeric first end portion and said substantially cylindrical elastomeric second end portion elongated outwardly extending axially along said bore axis out beyond second outer substantially frustospherical elastomeric distal second end portion.

22. An elastomeric bearing assembly according to claim 19, including at least one non-extensible nonelastomeric member with a first diameter proximate to a thinner portion and a second diameter proximate to a thicker end portion, and wherein the first diameter is larger than the second diameter.

23. A method of making a vehicle suspension system elastomeric bearing assembly, the method of making a vehicle suspension system elastomeric bearing assembly comprising:

providing a substantially cylindrical shaped elastomeric layer disposed between a first nonextensible nonelastomeric member surface and a second nonextensible nonelastomeric member surface, with the first and second nonextensible nonelastomeric member surfaces configured such that the substantially cylindrical elastomeric layer therebetween includes an end portion that is substantially thicker than at least one other thinner portion of the substantially cylindrical elastomeric layer, and providing a substantially frustospherical shaped elastomeric layer disposed between a third nonextensible nonelastomeric member surface and a fourth nonextensible nonelastomeric member surface, the fourth and third nonextensible nonelastomeric members are configured such that the substantially frustospherical elastomeric layer therebetween includes an end portion that is substantially thicker than at least one other thinner portion of the substantially frustospherical elastomeric layer wherein said substantially cylindrical shaped elastomeric layer, and said substantially frustospherical shaped elastomeric layer include a first and a second longitudinal extending split with said substantially cylindrical shaped elastomeric layer comprised of an upper split half cylindrical elastomeric portion and a lower split half cylindrical elastomeric portion, with said substantially frustospherical shaped elastomeric layer comprised of an upper split half frustospherical elastomeric portion and a lower split half frustospherical elastomeric portion, with a load direction directed downward through said lower split half cylindrical elastomeric portion, and said lower split half frustospherical elastomeric portion.

* * * * *